(12) United States Patent
Carrigg

(10) Patent No.: US 12,535,933 B2
(45) Date of Patent: Jan. 27, 2026

(54) SYSTEMS, METHODS AND DEVICES FOR AIDING IN THE DECOLONIZATION OF BACTERIA

(71) Applicant: BENUKA HEALTH, LLC, Lake Oswego, OR (US)

(72) Inventor: Alison Carrigg, Lake Oswego, OR (US)

(*) Notice: Subject to any disclaimer, the term of this patent is extended or adjusted under 35 U.S.C. 154(b) by 472 days.

(21) Appl. No.: 17/988,603

(22) Filed: Nov. 16, 2022

(65) Prior Publication Data

US 2023/0152942 A1    May 18, 2023

Related U.S. Application Data

(60) Provisional application No. 63/280,111, filed on Nov. 16, 2021.

(51) Int. Cl.
  *G06F 3/0482*    (2013.01)
  *A61K 31/155*    (2006.01)
  (Continued)

(52) U.S. Cl.
  CPC .......... *G06F 3/0482* (2013.01); *A61K 31/155* (2013.01); *A61M 35/006* (2013.01);
  (Continued)

(58) Field of Classification Search
  None
  See application file for complete search history.

(56) References Cited

U.S. PATENT DOCUMENTS 9,540,699 B2    1/2017   Sims
10,872,471 B1 * 12/2020  Stamp ................. G06F 3/04815
(Continued)

FOREIGN PATENT DOCUMENTS

EP    3106172 B1    8/2020

OTHER PUBLICATIONS

Fritz, Stephanie, et.al., "Effectiveness of Measures to Eradicate *Staphylococcus aureus* Carriage in Patients with Community-Associated Skin and Soft-Tissue Infections: A Randomized Trial," Infection Control & Hospital Epidemiology, Jan. 2, 2015, 17 pages.
(Continued)

*Primary Examiner* — James A Thompson
(74) *Attorney, Agent, or Firm* — Christopher Beckman; BECKMAN LAW P.C.

(57) ABSTRACT

New systems, methods and devices for aiding in the decolonization of bacterial infections in human and animal patients are provided. In some embodiments, a specialized decolonization, cleaning and infection prevention kit is provided, including a container with compartment(s) that include sub-compartment sections and GUI tools including specialized non-verbal instructions that guide the patient to use combinations of components of the sub-compartments in an infection prevention or decolonization regimen. In some embodiments, each such section provides a variety of decolonization and/or cleaning components for use decolonizing different parts of a user's body and/or environment at particular treatment intervals. In some embodiments, each of the compartment(s) and/or sub-compartment(s) corresponds with an instruction and timing for the use of the components within the compartment or sub-compartment. In some embodiments, a specialized computer system aids in the management of such a regimen, with specialized tracking and coverage-enhancing techniques.

19 Claims, 12 Drawing Sheets

(51) Int. Cl.
    *A61M 35/00*     (2006.01)
    *G02B 27/01*     (2006.01)
    *G06F 3/0481*     (2022.01)
    *G06F 3/04815*     (2022.01)
    *G06F 3/0484*     (2022.01)

(52) U.S. Cl.
    CPC ........ *G06F 3/0481* (2013.01); *G06F 3/04815* (2013.01); *G06F 3/0484* (2013.01); *G02B 2027/014* (2013.01)

(56) References Cited

U.S. PATENT DOCUMENTS

| | | | |
|---|---|---|---|
| 10,905,869 | B2 | 2/2021 | Tennican |
| 2010/0215626 | A1 | 8/2010 | Murphy |
| 2010/0331641 | A1* | 12/2010 | Bangera ............... A61B 5/0002 |
| | | | 702/19 |
| 2011/0301441 | A1* | 12/2011 | Bandic ................ A61B 5/4875 |
| | | | 600/306 |
| 2018/0264282 | A1 | 9/2018 | Bornstein |
| 2018/0344972 | A1 | 12/2018 | Woody |
| 2019/0169623 | A1 | 6/2019 | Starzl et al. |
| 2019/0201422 | A1 | 7/2019 | Sommer et al. |
| 2025/0157623 | A1* | 5/2025 | Kurani .................. A61B 5/681 |

OTHER PUBLICATIONS

Kuraitis, Drew, et.al., "Decolonization of *Staphylococcus aureus* in Healthcare: A Dermatology Perspective," Journal of Healthcare Engineering, Dec. 24, 2018, 9 pages.

Labordus-van Helvoirt, Renske E.M., et.al., "Tonsillectomy for persistent MRSA carriage in the throat—Description of three cases," International Journal of Infectious Diseases, Dec. 5, 2017, 4 pages.

Sachithanandam, Sangeetha Thirumazhisi, "Rising Methicillin-Resistant *Staphylococcus aureus* Infections in Ear, Nose, and Throat Diseases," Case Reports in Otolaryngology, Nov. 6, 2014, 4 pages.

Septimus, Edward J., et.al., "Decolonization in Prevention of Health Care-Associated Infections," Clinical Microbiology Reviews, Jan. 27, 2016, 22 pages.

\* cited by examiner

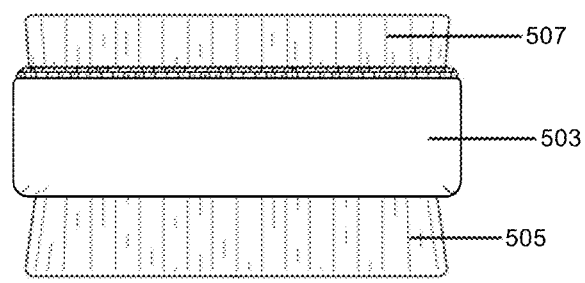
Fig. 7
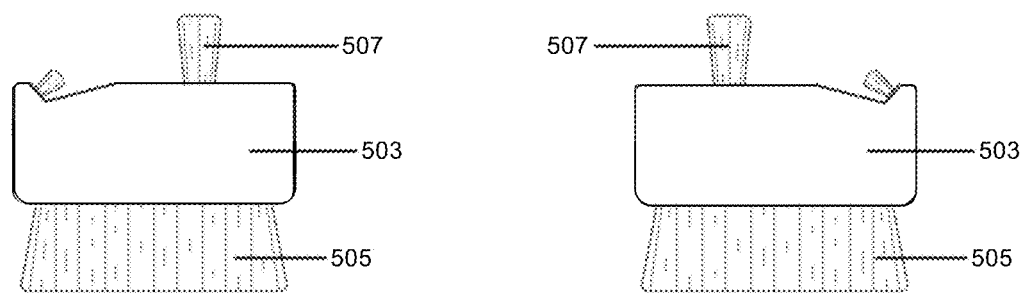
Fig. 8
Fig. 9

SYSTEMS, METHODS AND DEVICES FOR AIDING IN THE DECOLONIZATION OF BACTERIA

A portion of the disclosure of this patent document contains material which is subject to copyright protection. The copyright owners have no objection to the facsimile reproduction by anyone of the patent document or the patent disclosure, as it appears in the Patent and Trademark Office patent file or records, but otherwise reserves all copyright rights whatsoever. Unless otherwise stated, all trademarks and trade dress disclosed in this patent document and other distinctive names, emblems, and designs associated with product or service descriptions, are subject to trademark rights. The trademark and trade dress owner also reserves all trademark rights whatsoever.

CROSS-REFERENCE TO RELATED APPLICATIONS

This application claims the benefit of co-pending U.S. Provisional Patent Application No. 63/280,111, filed Nov. 16, 2021, titled "Systems, Methods and Devices for Aiding in the Decolonization of Bacteria," the entire contents of which are hereby incorporated by reference herein in their entirety.

FIELD OF THE INVENTION

The present invention relates to the treatment and prevention of infections, and systems, methods and devices aiding therein. And, more specifically, the present application relates to systems, methods and devices for aiding in the decolonization of methicillin-resistant *Staphylococcus aureus* ("MRSA").

BACKGROUND

Bacterial pathogens have always coexisted with humans. As humans evolved from hominid ancestors, the dangerous bacterial infections they host co-evolved with them, as demonstrated by several recent genetic studies. Although the human immune system is highly adapted to prevent bacterial infections, some bacteria still pose serious risks, particularly for humans with a weakened immune system.

Starting approximately 100 years ago, with the accidental discovery of Penicillin by Alexander Fleming, antibiotics have been isolated and administered to combat bacterial infections. Penicillin and other similar antibiotics existed in nature, as a product of evolution from fungi, which, themselves battle bacterial infections. The Penicillin class of antibiotics (known as methicillin or "β-Lactam" antibiotics) are dynamic proteins that kill bacteria by entering the bacterial cell in an inactive state to avoid its defenses. Once inside the bacteria, these antibiotics then self-activate (via the activating molecular ring, known as the β-Lactam ring) in the presence of a target enzyme within the bacteria, which enzyme is responsible for building the bacterial cell wall. By neutralizing that enzyme, β-Lactam antibiotics weaken and break apart the cell wall as water floods the bacteria's cell, in a process called lysis. Thus, in the presence of antibiotics, colonies of bacteria die off rapidly.

However, just as antibiotics have been developed to stave off bacterial infections, in response, bacteria have developed their own counter-defenses against antibiotics, known as resistance. For example, some bacteria generate an enzyme known as β-Lactamase, which breaks the activating (β-Lactam) ring of these antibiotics. With increasing medical use of antibiotics, bacteria have evolved having a higher and higher resistance, generating more and more β-Lactamase, making β-Lactam antibiotics less and less effective. Over time, and with increased use, bacterial resistance to antibiotics has increased greatly.

The medical industry has developed more varieties of antibiotics, with different modes of action. When a particular bacterial infection proves difficult to treat with one antibiotic, a doctor may prescribe an additional antibiotic with such a different mode of action. Yet, similarly, bacteria develop other forms of resistance to each of these alternative antibiotics. With the use of multiple forms of antibiotics in modern medicine, some bacteria have developed resistance to multiple forms of antibiotics. Such "multiple-drug resistant" bacteria (a.k.a. "Superbugs"), including methicillin-resistant *Staphylococcus aureus* ("MRSA"), pose a serious risk to human health in modern times, because even combinations of different antibiotics may prove to be ineffective or insufficiently effective. Multiple-drug-resistant bacteria are especially prevalent in a hospital setting, where bacteria evolve in a habitat where many different antibiotics are administered on a regular basis. As a result, ironically, while at the hospital, patients may acquire especially dangerous and difficult to treat infections, which may be completely unrelated to their ailment when admitted. The CDC recently estimated that 1 in 25 hospital patients is diagnosed with at least one infection related to hospital care. And that figure is almost certainly much lower than the number of undiagnosed infections at the hospital. Annually, some 75,000 patients die during their stay at a hospital from hospital-associated infections in the United States alone.

It is an underappreciated fact that infections are the leading cause of death for people under age 50, and the second leading cause of death, after heart disease, for people of all ages, worldwide. For example, the World Health Organization lists "lower respiratory infections" as the 4th leading cause of death worldwide, and places three other causes above it. However, if analyzed differently, considering all infections together, as one cause of death, infectious disease rises to the second position (or first position, for people under 50), as discussed above. Such level-shifting presentations, lowering the apparent prominence of infectious disease by sub-dividing it into multiple different "causes," while grouping other diseases more generally, mirrors the misperception by the public and health officials alike that infections, while serious, are not a top cause of death and disease like heart disease and cancer.

Although it is widely understood that viral infections have limited drug and other intervention options, society's long experience with effective antibiotics has led to a false sense of security, which may be proven wrong as antibiotics become less effective against increasingly resistant bacteria, and insufficient replacement antibiotics are discovered. It is also underappreciated that, at least in the main, existing antibiotics are not man-made, but extremely complex proteins evolved over thousands of years, which were then discovered in fungi by humans. It is less and less likely that new antibiotics will be similarly developed by nature and/or discovered in fungi, going forward, because the fungi have already been widely studied for antibiotic potential. It is also unlikely, at least in the near future, that the medical industry will be capable of independently developing completely new, effective antibiotic enzymes, with similar elaborate modes of action, as seen, for example, in β-Lactam antibiotics. Existing classes of such enzymes were all developed over many millennia through evolutionary processes, and the medical industry has had no success to date, in independently creating new enzyme classes.

There is still a need for more effective antibiotics, and, more specifically, antibiotics that will address multiple-drug-resistant bacteria, such as methicillin-resistant *Staphylococcus aureus*.

In recent years, personal computers have become far more powerful. For example, a relatively low-end household desktop computer today has over 1 million times more memory than the state-of-the-art guidance computer aboard Apollo 11 in 1969. Personal digital assistants ("PDAs") are a new form of small portable computer, allowing users to record and manage personal information, and they have been available in some form for decades. For example, as early as the 1970s, small digital wristwatches allowed users to perform personal computing, such as financial arithmetic, and storing information related to personal contacts, such as names, addresses and phone numbers. The now virtually ubiquitous smartphones can be thought of as modern PDAs, capable of sophisticated, highly secure communications over a network, and running some of the most complex computer programs. Like desktop computers, even common smartphones have had enormous computing capabilities for some time. To extend the example, an iPhone, by electronics manufacturer Apple, Inc., has over 100,000 times the processing power of the state-of-the-art Apollo 11 guidance computer in 1962.

A wide variety of specialized software has been designed to be run on smartphones, known as "Apps." Apps allow users to provide and receive a wide variety of data, and perform a wide variety of functions based on those data, ranging from online banking to digital gaming.

Some such Apps relate to personal health management. For example, many such Apps are currently available to aid users in managing health-relevant behavior.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of the inventor's own discoveries and work and work results.

SUMMARY OF THE INVENTION

New systems, methods and devices for aiding in the decolonization of bacterial infections in human patients are provided. In some embodiments, a specialized decolonization and cleaning kit is provided, including a container with compartment(s) that include sub-compartment sections and GUI tools including specialized non-verbal instructions that guide the patient to use combinations of components of the sub-compartments. In some embodiments, each section provides a variety of decolonization and/or cleaning components for use decolonizing different parts of a user's body and/or environment at particular treatment and/or cleaning intervals. In some embodiments, each of the compartment(s) and/or sub-compartment(s) correspond with a timing for the use of the components within the compartment or sub-compartment (e.g., each compartment, and components within, are configured to be opened and used according to a time sequence). For example, in some embodiments, the components include any or all of the following: (1) a locked, use-evident, single-use container of chlorine-based bleach (e.g., including $HCO_3$, e.g., in a 6% solution) and/or other microbial solution, configured for mixing with a range of volumes of water typically used in an antimicrobial bathing regimen; (2) a locked, use-evident, single-use container of higher concentration, of an antimicrobial gel (e.g., including benzoyl peroxide and/or chlorhexidine), for use with an ongoing stream of water, in an antimicrobial showering regimen; (3) a locked, use-evident, single-use container of benzoyl peroxide for application to a user's skin while showering; (4) One or more swabs, pre-soaked with povidone/iodine antiseptic, for application to the nostrils of the user, in use-evident packaging; (5) a chewable/ingestible antimicrobial; (6) A mouthwash, including an antiseptic for decolonizing the user's oral cavity and/or oropharynx; (7) One or more packet(s) of probiotics and nutritional supplements (e.g., vitamin, minerals and/or peptides) to be taken orally); (8) An oral, ingestible probiotic liquid, in a separate, use-evident container, e.g., as a final or penultimate step; (9) A probiotic and antimicrobial lotion, including ingredients to be applied to the user's epidermis after bathing (e.g., tea tree oil, oregano oil, antimicrobial peptides or amino acids, lemongrass oil, and/or, in some embodiments, microorganisms capable or recolonizing the micro-biome of the user, microorganism nutrients, and other skin nutrients, to be applied to the user's skin (whole body), e.g., as a final or penultimate step.

In some embodiments, the instructions and time sequence relate to a preferred timing for the use of the components. For example, in some embodiments, at least one of the compartment(s) relate(s) to a time, time period, dose or use, in which to use component(s) held within the compartment(s) and/or sub-compartment(s) thereof. In some embodiments, however, at least one of the compartment(s) holds component(s) for use in more than one time, time period, dose or use. In some such embodiments, such a compartment(s) may hold component(s) to which other compartment(s) and time periods also relate. For example, in some embodiments, one or more of the compartment(s) holds a component which is a tool (e.g., a specialized decolonizing scrub brush, in accordance with some aspects set forth in this application) configured to aid a user in using component(s) from a plurality of other compartments, each of which plurality of other compartments relates to a time in which to use at least one of such component(s) from a plurality of other compartments. In some embodiments, such a scrub brush is an example of a general-use item, and such general-use items are held outside of compartments and sub-compartments of the case.

In some embodiments, the selection of some components, based on the GUI tools, prevents the selection of other components. For example, in some embodiments, a patient may select and open a first sub-compartment including aspects of a treatment regimen, based on the GUI tools in the container. As a result, incompatible component(s) within other sub-compartment(s) become blocked and/or locked, in some embodiments. For example, as discussed in more detail elsewhere in this application, in some aspects, an antimicrobial bathing regimen (e.g., antibacterial skin cleansing in immersive water, e.g., in a bathtub), is supported by component(s) in such a first sub-compartment, and a different regimen (e.g., an anti-bacterial shower regimen) is supported by components of a second sub-compartment. In some embodiments, if a user (such as a patient) selects and/or opens the first sub-compartment, the second sub-compartment then becomes locked, preventing the opening of the second sub-compartment (or vice versa, in some embodiments). Of course, the example immediately above is only one example, among unlimited possibilities, and, in various embodiments, compartments and/or sub-compartments holding any component(s), when selected and/or opened, may similarly prevent the selection and opening of other compartments and/or sub-compartments, while still falling within the scope of the present application.

In some embodiments, any of the containers, packaging, compartment(s) and/or sub-compartment(s) set forth above may be tamper-evident or otherwise may indicate whether they have been opened and/or the component(s) within them have been accessed and/or used. Such tamper-evident or other access or use indicating containers, packaging, compartment(s) and/or sub-compartment(s) are referred to as "use-evident" in the present application.

In some embodiments, at least some of the GUI tools including specialized non-verbal instructions that guide the patient to use combinations of components of the sub-compartments are provided by a control system including specialized computer hardware and software, such as, but not limited to, any of the control systems set forth in this application. For example, in some such embodiments, such a control system and computer software include a specialized software App which includes such non-verbal instructions, for example, on a PDA, such as a smartphone. In some such embodiments, such an App provides additional GUI tools and techniques incorporating cameras and/or other sensors, to monitor and manage user compliance with a bacterial decolonization regimen. In some embodiments, such additional GUI tools and techniques include verbal instructions. In some such embodiments, such verbal instructions may be an alternative to, or provided in addition to, non-verbal instructions, such as that mentioned above.

In some embodiments, such an App also provides a new form of doctor/patient interface providing rapid guidance for users, aiding them in following such instructions, and in using such other GUI tools included within the App. In some such embodiments, a doctor's time spent monitoring and in-conversation with a user of the App is tracked, characterized and coded in new ways to allow for monetization by billing, with the aid of computer hardware and software on-board the PDA (e.g., within a Control System, such as any of the control systems set forth in this Application.) For example, in some embodiments, the user provides a consent to billing and necessary waivers of privacy limits, applicable to the doctor's interfacing with the user through the doctor/patient interface.

In some embodiments, other cleansing device(s) may be included in any of the cleaning kits in accordance with aspects of this application, and any of the GUI tools in accordance with this application guide a user to implement certain of the components above with such a cleansing device, while preventing other misuse. For example, in some embodiments, a new form of cleansing brush, with dedicated regions for cleansing different parts of a user's body, are included. In some such embodiments, such GUI tools may guide a user in applying such components to such dedicated regions and cleansing such different parts of the user's body. In some embodiments, such a cleansing device may be an applicator device, being made of materials suitable for applying any of the components set forth in this application to a user's body and/or a microbiome. In some such embodiments, such GUI tools may guide a user in applying such components both to the dedicated regions, and to parts of the user's body.

In some embodiments, one or more environmental cleansers may be included in the cleaning kit, and, in some such embodiments, any of the GUI tools in accordance with aspects of the application guide a user through an environmental cleaning regimen. In some embodiments, such an environmental cleaning regimen is carried out by another user. In some embodiments, such an environmental cleaning regimen is carried out by a user using personal protective equipment ("PPE"). In some embodiments, a cleaning kit in accordance with any aspects of the present application may include a compartment(s) or sub-compartment(s) including such PPE. In some embodiments, such an environmental cleanser is an antiseptic and/or anti-microbial cleanser.

In some embodiments, at least some of the component(s), and/or instructions included in the kit (e.g., demonstrated at least partially non-verbally, in specialized GUI tools) in various embodiments set forth above, are based on scientifically tested, peer-reviewed, published, reproduced, and/or widely or commonly accepted hypotheses (i.e., theories) set forth in literature relevant to the field of antimicrobial and antiseptic practices.

Canons of Construction

Where any term is set forth in a sentence, clause or statement ("statement") in this application, each possible meaning, significance and/or sense of any term used in this application should be read as if separately, conjunctively and/or alternatively set forth in additional statement(s), after the sentence, clause or statement, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

The embodiments set forth in detail in this application are to ease the reader's understanding of inventions set forth herein and, as such, are only examples of the virtually innumerable number of alternative embodiments falling within the scope of the application. No specific embodiment set forth in this application should be read as limiting the scope of any claimed inventions.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part.

BRIEF DESCRIPTION OF THE DRAWINGS

The features and advantages of the example embodiments of the invention presented herein will become more apparent from the detailed description set forth below when taken in conjunction with the following drawings.

FIG. 7 is a long side view of another example scrubbing device, which may be similar in nature to the scrubbing devices set forth in reference to FIGS. 5 and 6, above, which may be included in a decolonization and cleaning kit, such as any of the decolonization and cleaning kits set forth in this application, in accordance with some embodiments.

FIG. 8 is a short side view of another example scrubbing device, which may be similar in nature to the scrubbing devices set forth in reference to FIGS. 5, 6 and 7, above, which may be included in a decolonization and cleaning kit, such as any of the decolonization and cleaning kits set forth in this application, in accordance with some embodiments.

FIG. 9 is another short side view of another example scrubbing device, which may be similar in nature to the scrubbing devices set forth in reference to FIGS. 5-8, above, which may be included in a decolonization and cleaning kit, such as any of the decolonization and cleaning kits set forth in this application, in accordance with some embodiments

DETAILED DESCRIPTION OF THE INVENTION

The features and advantages of the example embodiments of the invention presented herein are directed to new forms of microbial infection decolonization and cleaning kits, and methods for their manufacturing and use, which are now described herein. These and other aspects will become more apparent from the detailed description set forth below when taken in conjunction with the following drawings. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number or other arrangement of components and sub-components (the following order, components, sub-components and/or relationships being non-limiting).

Figure 1:
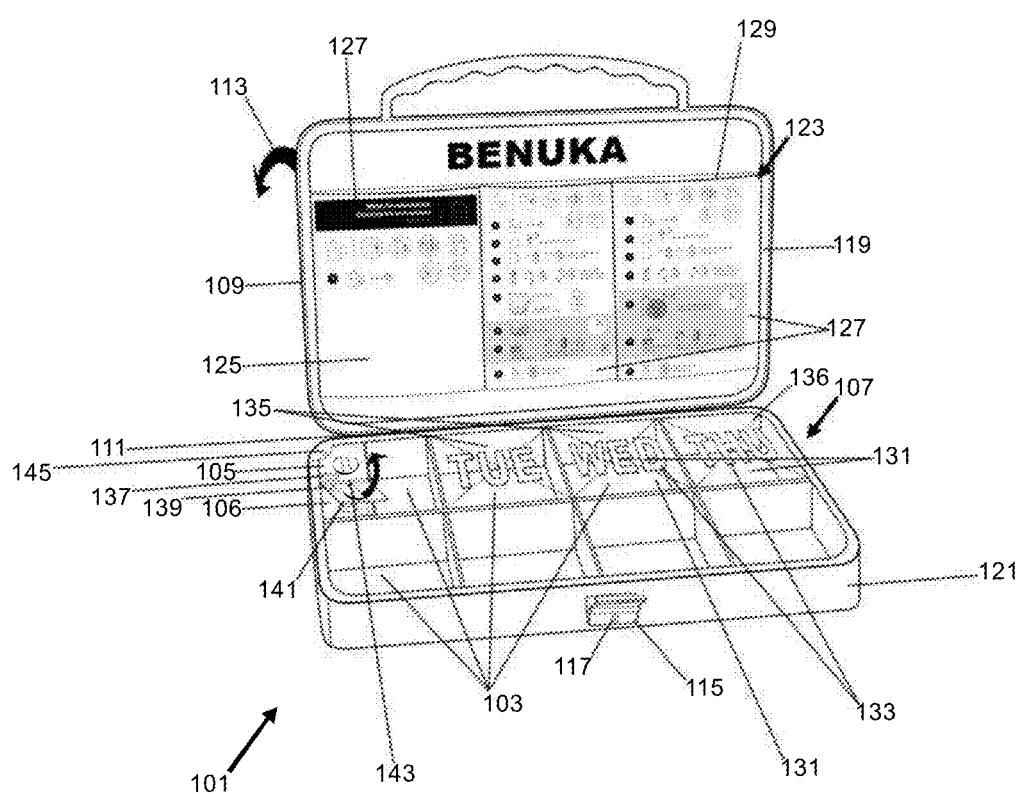
FIG. 1 is a perspective view of an example decolonization and cleaning kit including a case having a plurality of compartments and sub-compartments carrying components for aiding in the decolonization of microbes (e.g., bacteria, such as MRSA) from a human user's body, in accordance with aspects of the present invention.

FIG. 1 is a perspective view, of an example decolonization and cleaning kit including a case 101 having a plurality of compartments, some examples of which are depicted as compartments 103, and sub-compartments, such as example sub-compartments 105 and 106, carrying components for aiding in the decolonization of microbes (e.g., bacteria, such as MRSA) from a human user's body, in accordance with aspects of the present invention. In some embodiment, such a plurality of compartments (e.g., 7) each provide one or more components for use decolonizing different parts of a user's body. In some embodiments, such a plurality of compartments each correspond with a time(s) in which the components are to be accessed and used by the user in accordance with a bacterial decolonization regimen (e.g., the components of one compartment to be opened and used each day of a given week). In some embodiments, as discussed below, GUI tools provide guidance and instructions for a user, regarding such time(s) and use of components. In some embodiments, as also discussed in more detail below, such GUI tools, guidance and instructions are provided on a display of a control system (e.g., on a smartphone "App.")

Example case 101 includes an interior storage area 107, shown as exposed by a lifted upper lid 109, pivoting on a main, clamshell-style case hinge 111. Thus, in some embodiments, as pictured, example case 101 is configured to be opened, by pivoting upper lid 109, rotating it about hinge 111, as shown by example motion arrow 113. In some embodiments, upper lid 109 can then be closed, by pivoting it about hinge 111 in an opposite rotational direction than demonstrated by arrow 113. In some embodiments, example case 101 may be fastened shut by operation of a fastening clip 115. In some embodiments, fastening clip 115 includes a lock, such as example lock 117, enabling a user to variably and reversibly lock and restrict access to case 101, and components within it. In some embodiments, example case 101 includes an insulating material and/or a seal 119 (e.g., including an elastomeric material, such as rubber or silicone), protecting contents of example case 101 from heat, moisture and vapors, and/or loss thereof. In some embodiments, example case 101 includes any suitable, sturdy, lightweight material known in the art for portable cases including medicines and medical devices. For example, in some embodiments, example case 101 includes a hard (e.g., rotomolded) plastic outer housing 121.

As mentioned above, in some embodiments, example case 101 includes GUI tools 123, which may include specialized non-verbal instructions, such as the example pictographic guides 125, that guide a user (e.g., a medical patient) to use combinations of components of such compartments and/or sub-compartments of example case 101. As will be discussed in greater detail below, pictographic guides 125 provide symbolic, flow-chart and other non-verbal demonstrative communications to explain to a user which compartments, sub-compartments and components to access and use, and how to use them, but does not relying on any particular written language. Thus, in some embodiments, example case 101 can be mass manufactured for any number of different human civilizations, with any native language, including new civilizations and languages unanticipated at the time of tooling for production of example case 101. In some embodiments, GUI tools 123 may be in the form of a booklet. In some embodiments, GUI tools 123 may be in the form of an electronic or otherwise actuable display (e.g., a touch screen, driven by computer hardware and software). In some embodiments, GUI tools 123 may be provided on example insertable cards 127 (e.g., e-paper) and inserted into storage sleeves, such as example storage sleeve 129, (e.g., made of transparent plastic).

In some embodiments, each compartment of example case 101 provides one or more decolonization and/or cleaning components for use decolonizing different parts of a user's body and/or an environment. In some embodiments, example case 101 provides one or more decolonization and/or cleaning component at particular treatment and/or cleaning intervals. In some embodiments, each of the compartment(s), and/or sub-compartment(s) of each of the compartments, correspond with a timing for the use of the components within the compartment (e.g., each compartment, and components within, to be opened and used according to a time sequence). For example, in some embodiments, a series of compartments, such as example compartments 131, each correspond to a day of the week, indicating to a user (e.g., a medical patient provided with case 101) that the components held within each of them are to be used, as indicated by GUI tools 123, during the day designated. In some embodiments, the day of the week applicable to each such compartment may be represented by a timing indicator, such as the example day-of-the-week indicators 133, which may be provided on or about each such compartment. As an example, in some embodiments, the components of any or all of such compartments and/or sub-compartments, may include any or all of the following, in some embodiments: (1) a locked, use-evident, single-use container of chlorine-based bleach (e.g., including $HCO_3$, e.g., in a 6% solution) or other microbial solution, configured for mixing with a range of volumes of water typically used in an antimicrobial bathing regimen; (2) a locked, use-evident, single-use container of higher concentration, of an antimicrobial gel (e.g., including benzoyl peroxide and/or chlorhexidine gluconate), for use with an ongoing stream of water, in an antimicrobial showering regimen; (3) a locked, use-evident, single-use container of benzoyl peroxide for application to a user's skin while showering; (4) One or more swabs, pre-soaked with povidone/iodine antiseptic, for application to the nostrils of the user, in use-evident packaging; (5) a chewable/ingestible antimicrobial; (6) A mouthwash, including an antiseptic for decolonizing the user's oral cavity and/or oropharynx; (7) One or more packet(s) of probiotics and nutritional supplements (e.g., vitamin, minerals and/or peptides) to be taken orally); (8) An oral, ingestible probiotic liquid, in a separate, use-evident container, e.g., as a final or penultimate step; (9) A probiotic and antimicrobial lotion, including ingredients to be applied to the user's epidermis after bathing (e.g., tea tree oil, oregano oil, antimicrobial peptides or amino acids, lemongrass oil, and, in some embodiments, microorganisms capable or recolonizing the micro-biome of the user, microorganism nutrients, and other skin nutrients, to be applied to the user's skin (whole body), e.g., as a final or penultimate step. In various embodiments, any combination of the above components, or any number of them, provided in any number of compartments and/or sub-compartments, may be provided within such a case (case 101 being but one example, as will be readily apparent to those of skill in the art. In some embodiments, a user (e.g. a medical patient with a bacterial infection, such as a MRSA infection) provided with example case 101) accesses such components by piercing a user-evident upper barrier, such as example use-evident barriers 135, with easily broken scoring, such as example scoring 136.

In some embodiments, the selection of some components within some compartments or sub-compartments, by opening such a compartment or sub-compartment, prevents the selection of other components, within other compartments or sub-compartments of example case 101. For example, in some embodiments, a patient may select and open a first sub-compartment including aspects of a treatment regimen, based on the GUI tools in the container. As a result, incompatible component(s) within other sub-compartment(s) become blocked and/or locked. For example, in some embodiments, an antimicrobial bathing regimen (e.g., antibacterial skin cleansing in immersive water, e.g., in a bathtub), is supported by component(s) in such a first sub-compartment (e.g., sub-compartment 105) as indicated, for example, by example bathtub-compatible component indicator 137. But a different regimen (e.g., an anti-bacterial shower regimen) is supported by components of a second sub-compartment, as indicated, for example, by example shower-compatible component indicator 139. In some embodiments, if a user (such as a patient) selects and/or opens such a first sub-compartment, such a second sub-compartment then becomes locked, preventing the opening of the second compartment (or vice versa, in some embodiments). For example, in some embodiments, as sub-compartment door 141, covering the first sub-compartment, is opened, being swiveled upward on example hinge 143, it covers the top of the second sub-compartment. In some embodiments, such a sub-compartment door 139 may even snap or lock into place, e.g., with the aid of a lock 145 on or about the surface of closed door 141, covering the second sub-compartment. Of course, the example immediately above is only one example, among unlimited possibilities, and, in various embodiments, sub-compartments holding any component(s), when selected and/or opened, may similarly prevent or discourage the selection and opening of other sub-compartments, while still falling within the scope of the present application. In some embodiments, no such locking mechanism is provided. In some embodiments, such a locking mechanism is controlled by a control system including computer hardware and software, which may be a control system such as the example set forth below, in reference to FIG. 10. In some such embodiments, such a lock 145 may include an actuator configured to lock and unlock lock 145, based on commands from such a control system (e.g. via a wired or, if case 101 also includes wireless communications hardware, wireless, connection between the actuator and the remainder of the control system). In some embodiments, as discussed further below, the control system includes a camera or other sensor(s), for monitoring the behavior of users of case 101, and providing GUI tools, instructions, guidance and access to compartment(s), sub-compartment(s) and components held within case 101, based on data from such sensors. For example, in some embodiments, the control system may determine that a user has accessed such a first compartment via such a sensor, and may then prevent access to such a second compartment, or provide access to a third compartment (e.g., via such an actuator(s) attached to such a lock and/or door(s) covering such compartments and/or sub-compartments, in some embodiments), based on software provided in the control system.

In some embodiments, data gathered from such sensor(s) of user behavior may be collected and recorded on such a control system. In some such embodiments, such software may be present, or partially present, within such a smartphone or other peripheral device (e.g., as a computer software application or "App"), which may be in communication with the control system of case 101.

In some embodiments, one or more environmental cleansers may be included in the cleaning kit, and the GUI tools guide a user through an environmental cleaning regimen. In some embodiments, such an environmental cleaning regimen is carried out by another user. In some embodiments, such an environmental cleaning regimen is carried out by a user using personal protective equipment ("PPE").

In various embodiments, example case 101 may also include any other materials for portable cases known to those of skill in the art, in addition to any of the aspects set forth above.

As an alternative, and/or in addition to the components set forth above, in some embodiments, case 101 may include any or all of the following additional components, along with corresponding GUI tools providing guidance for the following:
 An environmental antiseptic/antimicrobial cleanser;
 Essential oils ("EO's") with known anti-microbial properties, such as Eucalyptus EO or Tea Tree EO, may be included in the kit;
 An oral antimicrobial, e.g., CHG (chlorhexidine) paste, to be applied to the posterior oropharynx for intubated ICU patients;
 In some embodiments, a chewable tablet may be included to treat the mucosa of the oral cavity, oropharynx and esophagus. The chewable tablet may have both antiseptic and probiotic components. For example, in some embodiments, an anti-microbial mouthwash ingredient(s) may include pro-*Streptococcus epidermidis* (healthy skin bacterium) probiotic(s)/cofactor(s)s.

Figure 2:
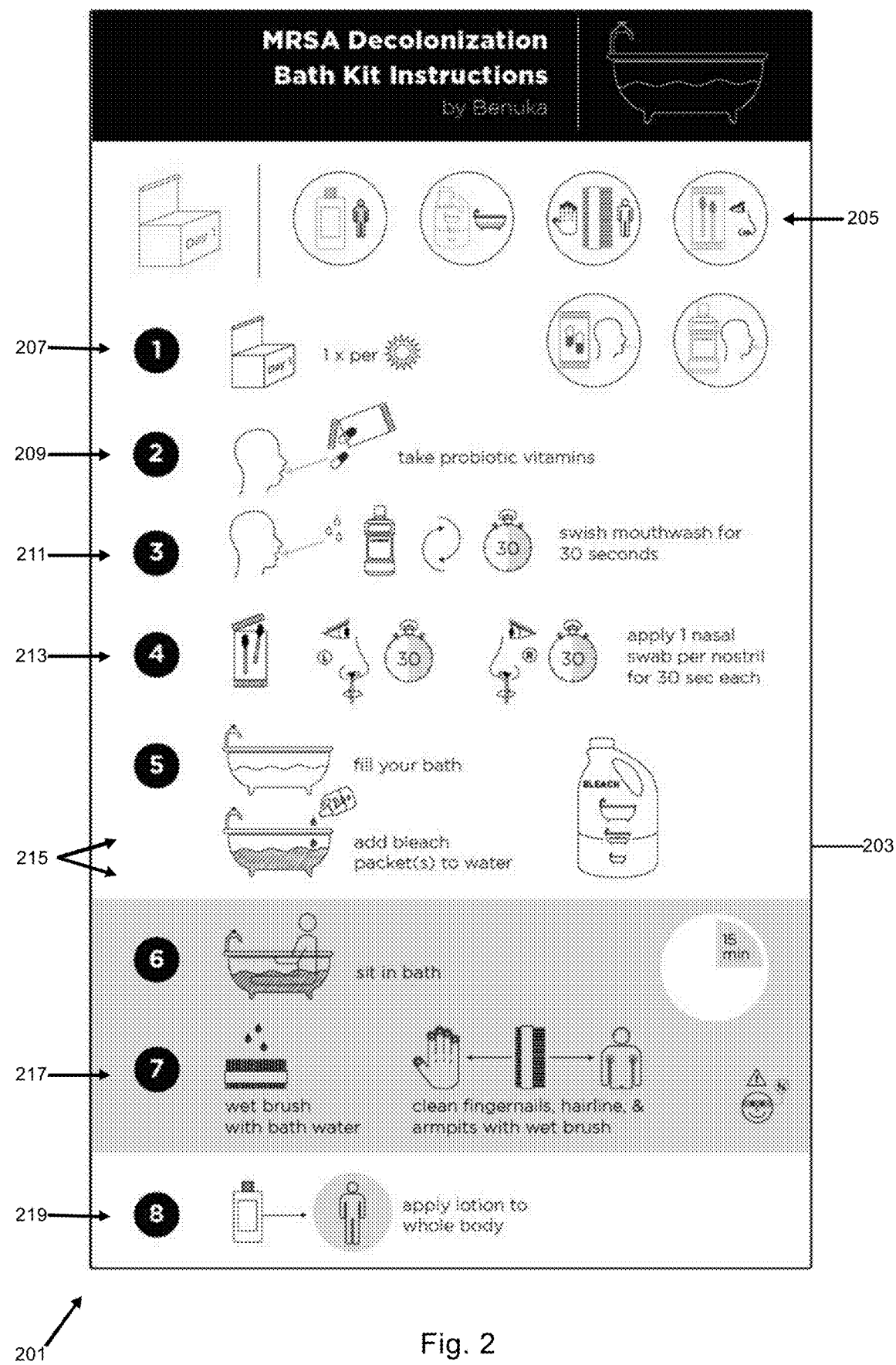
FIG. 2 depicts some example GUI tools, some of which were among the GUI tools discussed in reference to FIG. 1, above, presented on a page, card, part of a booklet, or on a display or other GUI, providing non-verbal (e.g., pictographic) guidance to a user(s).

FIG. 2 depicts some example GUI tools, such as GUI tools 201, some of which were among the GUI tools discussed in reference to FIG. 1, above, shown presented on a page, card, part of a booklet, or on a display 203, providing at least some non-verbal (e.g., pictographic) guidance to a user(s), such as example pictographic guidance 205. In some embodiments, any of such GUI tools may be provided within, and controlled by, a control system including computer hardware and software, such as, but not limited to, the example control system set forth below, in reference to FIG. 10, in some embodiments.

GUI tools 201 may include a wide variety of alternate forms of pictographic non-verbal and verbal instructions to a user. For example, in some embodiments, GUI tools 201 include tools demonstrating the use of components at a particular time, time period or other timing-related information based on a recommended regimen, such as example timing-related GUI tools 207. As another example, in some embodiments, GUI tools 201 include tools demonstrating the use of particular components such as probiotic vitamins, mouthwash for decolonizing the user's oral cavity and/or oropharynx, nasal swabs loaded with antiseptic, antibacterial additives for bathwater, a scrubbing device, and/or a probiotic and antimicrobial lotion, as shown in example GUI tools 209, example GUI tools 211, example GUI tools 213, example GUI tools 215, example GUI tools 217 and example GUI tools 219, respectively.

As mentioned above, in some embodiments, a smartphone or other peripheral device-based app is included, as a part of, or in communication with, a control system included in case 101. In some such embodiments, such a peripheral device and/or control system may relay instructions and monitor user behavior, such as a user's access to compartments, sub-compartments and components held within case 101, or otherwise may observe compliance of the user with a decolonization regimen and instructions provided on the GUI tools 201 and instructions therein.

In some embodiments, the app may also monitor clearance/decolonization of the infection. In some embodiments, additional kits and/or compartments may be shipped to a user, based on such monitoring, at needed intervals. (e.g., up to a 4-month supply of kits/compartments/components).

Figure 3:
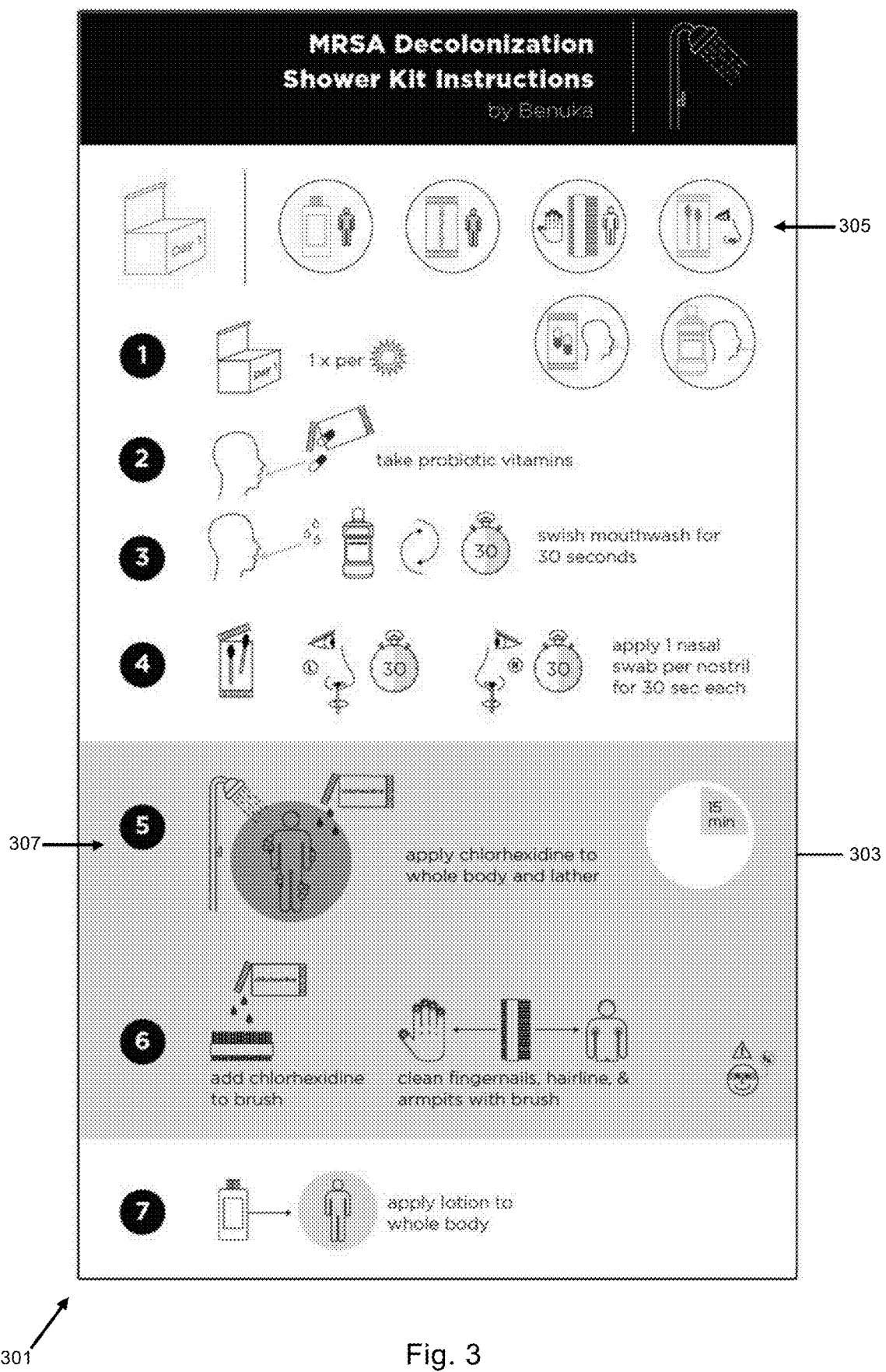
FIG. 3 depicts some additional example GUI tools, at least some of which are among the GUI tools discussed above, in the form of a page, card, part of a booklet, or on a display or other GUI, providing additional non-verbal (e.g., pictographic) guidance to a user(s).

In some embodiments, a user's family members are also given at least some of the components of the kit, or full kits themselves. In some embodiments, the user may also be prescribed an antibiotic (e.g., oral), for use along with the components above, in the same, or a separate kit, with compartment(s) and/or sub-compartment(s) containing such components. FIG. 3 depicts some additional example GUI tools, such as GUI tools 301, some of which were among the GUI tools discussed above, shown presented on a page, card, part of a booklet, or on a display 303, providing at least some non-verbal (e.g., pictographic) guidance to a user(s), such as example pictographic guidance 305. As with other example GUI tools set forth in the present application, in some embodiments, any of such GUI tools 301 may be provided within, and controlled by, a control system including computer hardware and software, such as, but not limited to, the example control system set forth below, in reference to FIG. 10, in some embodiments.

As with example GUI tools 201, GUI tools 301 may include a wide variety of similar, alternate forms of pictographic non-verbal and verbal instructions to a user. However, in some embodiments, GUI tools 301 may include alternative forms, guidance and instructions, providing different options from GUI tools 201, based on decision(s) made by a user and/or control system. For example, in some embodiments, a user and/or the control system may determine that an alternate regimen is appropriate, based on data input by a user. For example, in some embodiments, as discussed elsewhere in this application, a user may determine that showering, rather than bathing in a bathtub, is necessary or desired. Thus, some of GUI tools 301— namely alternative example GUI tools 307, which include tools demonstrating the use of an antimicrobial in showering—are provided, in place of other GUI tools set forth above.

As mentioned above, in some embodiments, a smartphone or other peripheral device-based app is included, as a part of, or in communication with, a control system included in case 101. In some such embodiments, such a peripheral device and/or control system may relay instructions and monitor user behavior, such as a user's access to compartments, sub-compartments and components held within case 101, or otherwise may observe compliance of the user with a decolonization regimen and instructions provided on the GUI tools 301 and instructions therein.

Figure 4:
FIG. 4 depicts some additional example GUI tools, some of which were among the GUI tools discussed above, in the form of a page, card, or part of a booklet, providing non-verbal (e.g., pictographic) guidance to a user(s).

FIG. 4 depicts some additional example GUI tools, such as GUI tools 401, some of which were among the GUI tools discussed above, shown presented on a page, card, part of a booklet, or on a display 403, providing at least some non-verbal (e.g., pictographic) guidance to a user(s), such as example pictographic guidance 405. As with other example GUI tools set forth in the present application, in some embodiments, any of such GUI tools 401 may be provided within, and controlled by, a control system including computer hardware and software, such as, but not limited to, the example control system set forth below, in reference to FIG. 10, in some embodiments.

In some embodiments, example GUI tools 401 comprise non-verbal instructions that are more general in nature than some of GUI tools 201 and GUI tools 301.

As mentioned above, in some embodiments, a smartphone or other peripheral device-based app is included, as a part of, or in communication with, a control system included in case 101. In some such embodiments, such a peripheral device and/or control system may relay instructions and monitor user behavior, such as a user's access to compartments, sub-compartments and components held within case 101, or otherwise may observe compliance of the user with a decolonization regimen and instructions provided on the GUI tools 401 and instructions therein.

Figure 5:
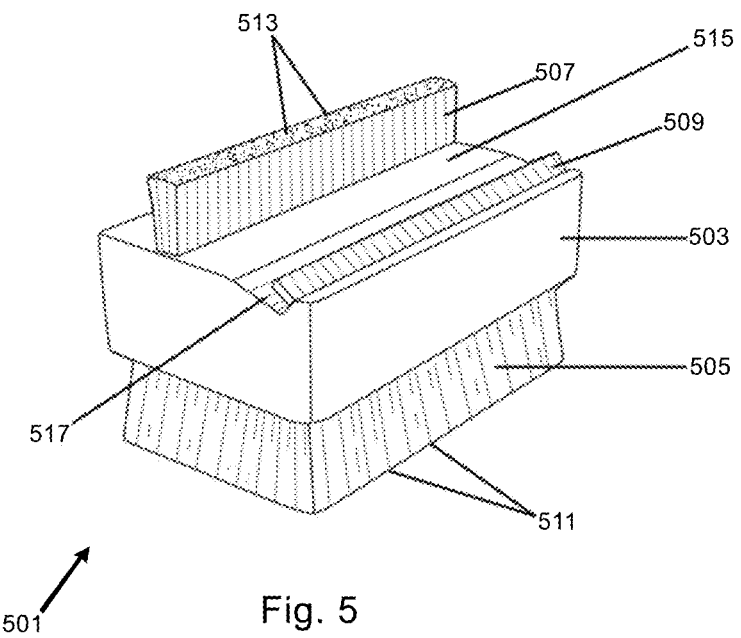
FIG. 5 is a perspective view of an example scrubbing device which may be included in a decolonization and cleaning kit, such as any of the decolonization and cleaning kits set forth in this application, in accordance with some embodiments.

FIG. 5 is a perspective view of an example scrubbing device 501 which may be included in a decolonization and cleaning kit, such as any of the decolonization and cleaning kits set forth in this application, in accordance with some embodiments. In some embodiments, example scrubbing device 501 is a brush with a rigid housing 503, from which a plurality of different bristle sets are attached and extend. For example, in some embodiments, example scrubbing device 501 includes two or three sets of bristles extending from housing 503, such as example lower, main bristle set 505, example upper, thin bristle set 507, and example smallest, fingernail brush 509. In some embodiments, lower, main bristle set 505 may comprise a thick, wide scrubbing area, formed by the ends (not pictured in the present figure) of bristles, such as example bristles 511, of which lower, main bristle set 505 is formed. In some embodiments, example upper, thin bristle set 507 may also be formed from bristles, such as example bristles 513, whose exposed length is greater than bristles 511 and, in some embodiments, extend at a right angle (perpendicular) or approximately at a right angle, from a flat, upper housing portion 515. In some embodiments, example smallest, fingernail brush 509 may be thinner and smaller than other brushes included in scrubbing device 501, formed from bristles with an exposed length shorter than such other brushes.

In some embodiments, a patient/user using scrubbing device 501 to decolonize and clean her or his epidermis, may place other components, suitable for applying to their epidermis, onto any or all of such bristle sets.

In some embodiments, any of such bristle sets may be set in, or set partially in, a groove or other inset portion, such as example inset housing portion 517, of housing 503. In some embodiments, housing 503 may include a handle portion 519, suitable for holding and manipulating example scrubbing device 501 by hand.

Of course, the example scrubbing device 501 does not limit the present application, being just one example of the virtually unlimited form, number and combination of scrubbing and other cleaning devices that may be included in decolonization and cleaning kits set forth in the present application. For example, in some embodiments any of the decolonization and cleaning kits set forth in this application may also include other forms of scrubbing devices, or no scrubbing device, for use with other components of such a decolonization or cleaning kit, or alone, similarly to scrubbing device 501. As one example, in some embodiments, decolonization and cleaning kits set forth in this application may include a soft mesh ball or other scrubbing device substantially covered with bristles, a brush, or brush material. In some embodiments, such an other scrubbing device may be in the form of a loofah (e.g., a loofah ball). In some such embodiments, such a loofa may include a handle, extending from and attached to the loofa.

Figure 6:
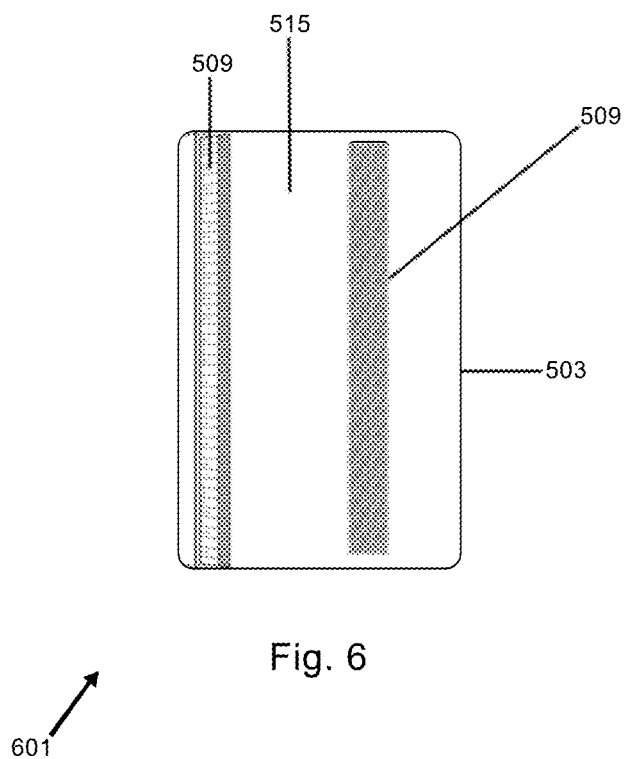
FIG. 6 is a top view of another example scrubbing device, which may be similar in nature to the scrubbing device set forth in reference to FIG. 5, above, which may be included in a decolonization and cleaning kit, such as any of the decolonization and cleaning kits set forth in this application, in accordance with some embodiments.

FIG. 6 is a top view of another example scrubbing device, which may be similar in nature to the scrubbing device set forth in reference to FIG. 5, above, which may be included in a decolonization and cleaning kit, such as any of the decolonization and cleaning kits set forth in this application, in accordance with some embodiments.

FIG. 7 is a long side view of another example scrubbing device, which may be similar in nature to the scrubbing devices set forth in reference to FIGS. 5 and 6, above, which may be included in a decolonization and cleaning kit, such as any of the decolonization and cleaning kits set forth in this application, in accordance with some embodiments.

FIG. 8 is a short side view of another example scrubbing device, which may be similar in nature to the scrubbing devices set forth in reference to FIGS. 5, 6 and 7, above, which may be included in a decolonization and cleaning kit, such as any of the decolonization and cleaning kits set forth in this application, in accordance with some embodiments.

FIG. 9 is another short side view of another example scrubbing device, which may be similar in nature to the scrubbing devices set forth in reference to FIGS. 5-8, above, which may be included in a decolonization and cleaning kit, such as any of the decolonization and cleaning kits set forth in this application, in accordance with some embodiments.

Figure 10:
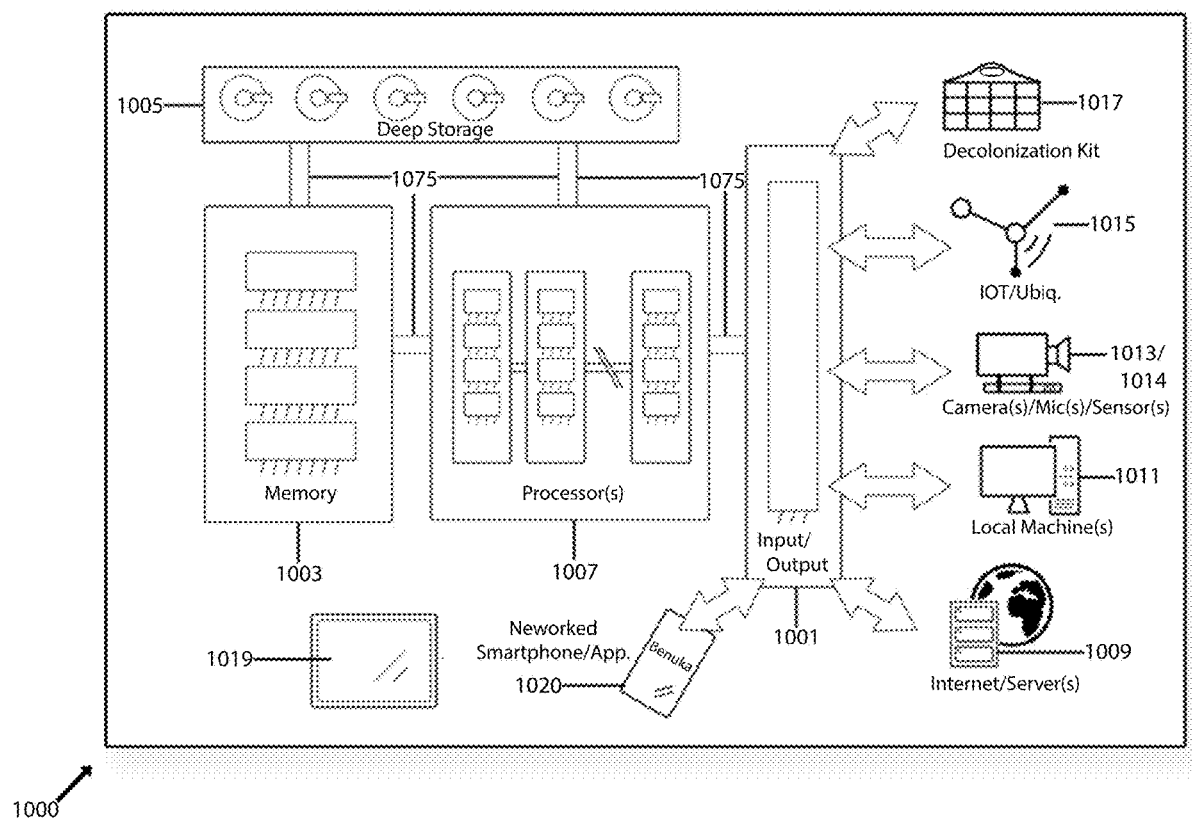
FIG. 10 is a schematic block diagram of some elements of a control system in accordance with some example embodiments of the invention.

FIG. 10 is a schematic block diagram of some elements of a control system (hereinafter, the "system" or "control system") 1000, including computer hardware and software, in accordance with some example embodiments of the present invention. In some example embodiments, the control system incorporates a non-transitory machine-readable medium storing instructions that, when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 1000 shown depicts some example embodiments.

Control system 1000 includes an input/output device 1001, a memory device 1003, long-term data storage device 1005, and processor(s) 1007. The processor(s) 1007 is (are) capable of receiving, interpreting, processing and manipulating signals and executing instructions for further processing and for output, pre-output and/or storage in and outside of the system. The processor(s) 1007 may be general or multipurpose, single- or multi-threaded, and may have a single core or several processor cores, including microprocessors. Among other things, the processor(s) 1007 is/are capable of processing signals and instructions for the input/output device 1001, to cause a user interface to be provided or modified for use by a user on hardware, such as, but not limited to, computer system peripheral devices, such as a mouse, keyboard, touchscreen and/or other display 1019, providing specialized tools (e.g., providing a graphical user interface, a.k.a. a "GUI," providing any of the GUI tools as set forth in this application for guiding a user in accessing compartments and sub-compartments of a cleaning kit, and using components within such a kit.) In some embodiments, such signals and instructions are based on display-controlling and input-facilitating software (e.g., on local machine(s) 1011, display 1019 or smartphone 1020).

For example, user interface aspects, such as graphical "windows," "buttons" and data entry fields, may present via, for example, a display, any number of selectable options and/or data entry fields. When the option and/or data entry field is selected or data is entered by a user, such selection and/or data entry causes aspects of the control system to command other aspects of the control system to present additional instructions, GUI tools or other guidance to the user related to managing a bacteria decolonization and/or recolonization regimen, in some embodiments. In some embodiments, such selection and/or data entry causes aspects of the control system to provide access to and/or order the use of particular compartments, sub-compartments and/or components thereof, in some embodiments. For example, and as explained in greater detail elsewhere in this application, the control system may provide additional non-verbal guidance to a user related to one compartment or sub-compartment, in response to a user following other guidance, related to other compartments or sub-compartments. In some embodiments, the control system may facilitate recording data related to the following of such a regimen by the user (e.g., through cameras or other sensors, included in the control system). The processor(s) 1007 may execute instructions stored in memory device 1003 and/or long-term data storage device 1005, and may communicate via system bus(ses) 1075. Input/output device 1001 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 1001, memory device 1003, data storage device 1005, and processor(s) 1007 are connected and able to send and receive communications, transmissions and instructions via system bus(ses) 1075. Data storage device 1005 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. In any event, the system may include, or include network connections (e.g, wired, WAN, LAN, 5G, ethernet, satellite, and/or Internet connections) with, any of the example devices or auxiliary devices and/or systems, shown as Internet server(s) 1009, local machine(s) 1011, cameras and microphones 1013, sensor(s) 1014, internet of things or other ubiquitous computing devices 1015, cleaning kit 1017, scanner 1019 and smartphone 1020. Similarly, the control system 1000 is capable of accepting input from any of those auxiliary devices and systems, and modifying stored data within them and within itself, based on any input or output sent through input/output device 1001.

Input and output devices may deliver their input and receive output by any known means, including, but not limited to, any of the hardware and/or software examples shown as internet server(s) 1009, local machine(s) 1011, cameras and microphones 1013, sensor(s) 1014, internet of things or other ubiquitous computing devices 1015, ERP 1017, display 1019 and smartphone 1020.

While the illustrated example of a control system 1000 in accordance with the present invention may be helpful to understand the implementation of aspects of the invention, any suitable form of computer system known in the art may be used—for example, in some embodiments, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN, satellite communications networks, 5G or other cellular networks, and/or any of the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 11:
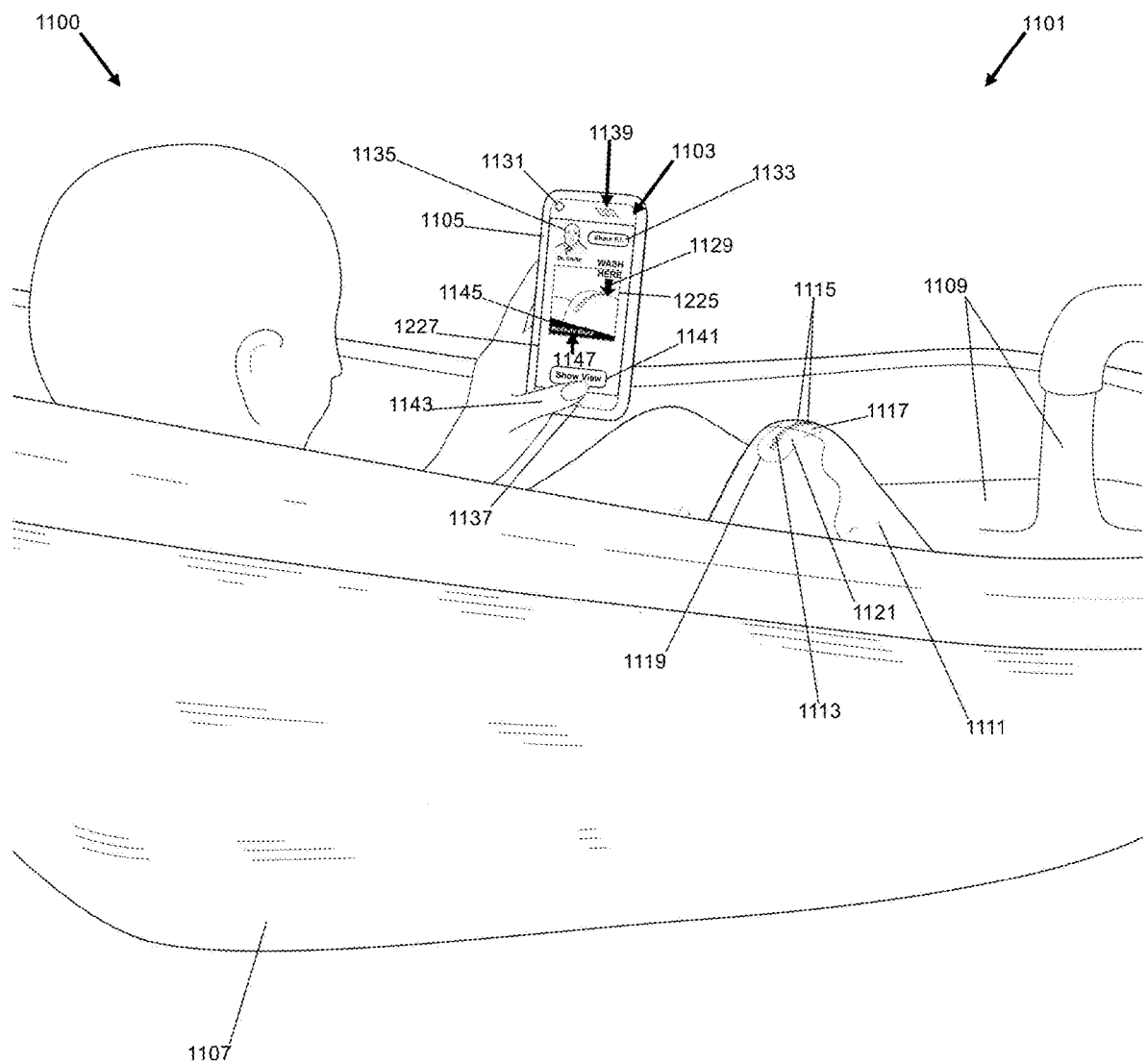
FIG. 11 is a perspective view of an example usage environment for an App providing GUI tools, such as example GUI tools, on an example smartphone, and implementing example techniques to monitor and manage user compliance with a bacterial decolonization regimen, in accordance with some embodiments.

FIG. 11 is a perspective view of an example user 1100 within a usage environment 1101 for an App providing GUI tools, such as example GUI tools 1103, provided on an example smartphone 1105, and implementing example techniques to monitor and manage user compliance with a bacterial decolonization regimen, in accordance with some embodiments. As with other computer systems set forth in the present application, in some embodiments, smartphone 1105 includes a control system including specialized computer hardware and software, such as any of the example control systems set forth in the present application (e.g., the control system(s) set forth in reference to FIG. 10, above). And, as with other examples of specialized computer hardware and software set forth in the present application, in some embodiments, smartphone 1105's control system is running an App aiding in the management and administration of a bacteria decolonization and/or infection prevention ("bacteria decolonization") regimen, which may include any of the bacteria decolonization techniques set forth in the present application, as well as additional techniques carried out with the aid of the App and control system. Some such example techniques are discussed below:

In accordance with some embodiments, user 1100 is mid-process in the implementation of such a bacteria decolonization regimen, in the example context of a bathing ritual and environment, usage environment 1101. It should be noted that the example of a bathing ritual within a bath environment is not limiting, and only one example, selected for ease of understanding, among virtually infinite possible example environments in which bacterial decolonization and antiseptic techniques in accordance with the present application may be carried out, as will be apparent to those of skill in the art. As another example, in some embodiments, which are preferred, usage environment 1101 may, instead, be a showering environment and/or shower stall, as an alternative to, or in addition to, a bathing environment. In any either example context, and in some embodiments, user 1100 has observed verbal and/or non-verbal instructions (such as any of the instructions set forth in this application) for implementing such a regimen. For example, user 1100 has received an instruction to draw a bath, but filling example bath tub 1107 with warm water 1109, disrobe, and get into the bath tub 1107, having a clean towel and change of clothes ready, each of which instructions she has followed, in some embodiments. In addition, user 1100 is now being guided in the application of a cleanser, antiseptic, agent, lotion, and/or other formulation and/or preparation, which formulation and/or preparation may be, but is not limited to, any of the example formulations discussed in this application. For example, in some embodiments, user 1100 may be instructed to obtain, open and use a sterile sponge or brush (e.g., such a brush provided in this application) saturated with an antiseptic preparation, such as, but not limited to, chlorhexidine gluconate or a preparation or other product including chlorhexidine gluconate, to cover the entire surface (epidermis) of her entire body (e.g., starting from the ears, and proceeding downward to the toes). In some embodiments, as discussed elsewhere in this application, such surfaces may include surfaces other than epidermis, such as the nasal cavity, other epithelial surfaces, or even non-epithelial surfaces. In some such embodiments, a different antiseptic preparation and device may be used (e.g., BETADYNE, via nasal swabs, as provided elsewhere in this application. In some embodiments, using sensors (which may be included within example smartphone 1105, in some embodiments) the application of such a formulation and/or preparation is monitored, tracked and recorded. For example, in some embodiments, a plurality of 3D tracking markers are provided on or about the surface of the sponge or brush, which may be so tracked in both position and orientation by a control system included in smartphone 1105 (which may, in some embodiments, be a control system including computer hardware and software, such as the control system set forth in FIG. 10, above).

In some embodiments, 3D object recognition and tracking hardware may be included in and/or connected with smartphone 1105 and, in some embodiments, in conjunction with 3D object recognition and tracking software also stored and running on smartphone 1105, may track and record the location and position of the surface of the user's body parts. In some embodiments, the locations of the cleaning surface of the sponge/brush and the outer surface (epidermis) of such body parts are compared to determine where contact between them has occurred. In such embodiments, areas of the user's epidermis that have been covered by antiseptic may then be determined, based on that contact, and recorded. Furthermore, in some embodiments, areas where such contact and coverage have not occurred can similarly be determined and recorded. In some embodiments, smartphone 1105 may then create specialized GUI tools that alert the user as to the lacking contact and coverage.

Figure 12:
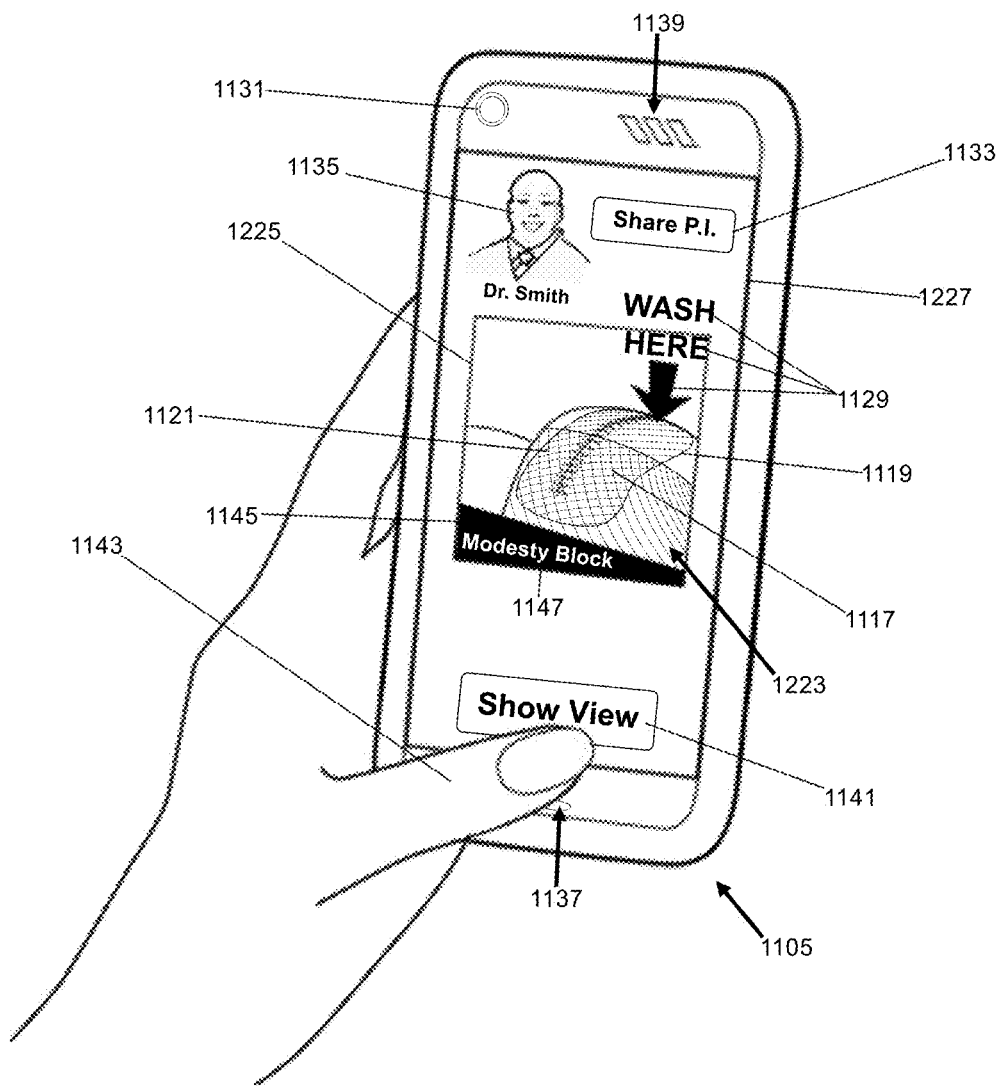
FIG. 12 is a perspective view of the same example smartphone as set forth with respect to FIG. 12, above, implementing example techniques to monitor and manage user compliance with a bacterial decolonization regimen, in accordance with some embodiments.

For example, in some embodiments, such a sensor aids the control system, when executing the App, to recognize and track the location of user 1100's right leg 1111, which has been subjected to a surgical procedure and therefore presents a risk of infection (e.g., by MRSA), particularly at or about the location of an example surgical incision 1113, which may have been closed by sutures, such as the example sutures 1115, but still has not entirely healed. In various embodiments, the App and control system may use any methods and techniques known in the art for recognizing objects with the use of sensors, such as object recognition and computer vision techniques (e.g., by boundary and feature recognition and matching, with cameras and other optical sensors). In some such embodiments, an area on or about such an incision or other injury location may be defined and tracked by the control system as an infection risk area, such as example infection risk area 1117, which may be defined by a perimeter 1119 at or about a particular distance from such an incision, or other wound (e.g., being defined by 1-inch margins from the edge of such a wound. In some such embodiments, infection risk area 1117 is shown as a virtual object (e.g., a shape 1121 that may include a semi-transparent color enhancement or pattern, such as the example provided as semi-transparent color enhancement or pattern 1223 of GUI tools 1103, overlaid onto a view of the user's epidermis in that area, as may be shown in an AR display area 1225 of smartphone video display 1227. (It should be noted that example semi-transparent color enhancement or pattern 1223 is not shown in FIG. 11, due to size and resolution constraints, but is shown in reference to FIG. 12, below).

However, in some embodiments, such an incision is a planned, future incision, and the decolonization regimen is being carried out in advance of the wound caused by incision. In some such embodiments, an authorized physician or other healthcare provider for the user may indicate and record such a future location of a surgical area on or about the user's body, and such an infection risk area 1117, which is then stored and so indicated by the smartphone 1105 and App, using GUI tools 1103. In some embodiments, such a healthcare provided may physically mark the planned incision (e.g., as a line created with a pen) and the control system, when executing the App, recognizes that physical marking (e.g., due to being made in a coded ink color or pattern) as a planned future incision, and then maps out such 3D risk area and/or virtual object by anchoring them around the planned incision so indicated.

In some embodiments, the specialized GUI tools that alert the user as to the lacking contact and coverage may include another form of indicator, such as example coverage requirement indicator 1129, indicating where, on user 1100's right leg 1111, further cleaning and/or antiseptic coverage may be required. In some embodiments, example coverage requirement indicator 1129 may also be presented on or about AR display area 1225. Thus, by viewing AR display area 1225 and other GUI tools 1103, the user 1100 may view and determine which areas of the surface of her body have, and have not, received adequate coverage from a cleaning and/or antiseptic preparation. In some embodiments, a bacteria decolonization regimen may require multiple applications of such a cleaning and/or antiseptic preparation. In such embodiments, additional (repeated) coverage requirement indicators and virtual objects may be provided, to similarly guide the user in the repetition of the cleaning and application of the cleaning and/or antiseptic preparation.

The sensors used by smartphone 1105, and the control system and App included within it, may be any suitable sensor(s) for tracking objects in 3D space. For example, in some embodiments, smartphone 1103 includes one or more camera(s), such as example user-facing, front-side smartphone camera 1131, and a more common, environment-facing main camera (not pictured, but present on the opposite, back side of smartphone 1103, in some embodiments). In some such embodiments, either of those cameras may be used in such 3D tracking techniques. However, in some embodiments, other types of tracking sensors may be used, both on-board or external to smartphone 1105, in various embodiments, such as LIDAR, SONAR, ultrasound, infra-red, and motion-tracking sensors. In some embodiments, the cleanser or other preparation itself may include a trackable aspect, such as a visible color, to aid in the determination of areas of the surface of her body have, and have not, received adequate coverage from a cleaning and/or antiseptic preparation.

As mentioned above, in some embodiments, an App also provides a new form of doctor/patient interface providing rapid guidance for users, aiding them in following such instructions, and in using such other GUI tools included within the App.

In some such embodiments, a doctor's time spent monitoring a patient, and spent in-conversation with a user of the App is tracked, characterized and coded in new ways to allow for monetization by billing, with the aid of computer hardware and software on-board the PDA (e.g., within a Control System, such as any of the control systems set forth in this Application.) For example, in some embodiments, the user requests to summon a doctor's assistance through GUI tools of the App, and/or provides a consent to billing therefor, e.g., in a preliminary clearance GUI (not pictured). For example, in some embodiments, a user may press a GUI button or slider with an indicator that it will "Call Your Doctor" when activated (not pictured, but within a precursor screen and set of GUI tools than that pictured as GUI tools 1103). As a prerequisite to making such a request (and/or in some such embodiments, to initiating the App-assisted doctor/patient interaction) the control system may require the user to press a legal waiver and/or consent button 1133 of GUI tools 1103. If the user provides such consent, a doctor may be alerted, through a separate interface, that his or her patient has requested that he or she participate in a virtual doctor's visit with the user, through the doctor/patient interface. If the doctor then responds, and indicates a willingness to engage in the App-assisted doctor/patient interaction, the GUI tools 1103 and App may then include additional doctor-patient interactive tools. For example, a live video image 1135 of the doctor may be provided, as part of the App-assisted doctor/patient interaction, allowing the doctor and user to interact visually. As another example, the doctor and patient may each have a microphone, such as example smartphone microphone 1137, and may each have a speaker, such as example smartphone speaker 1139 controlled by the control system, allowing for real-time spoken conversations, as part of the App-assisted doctor/patient interaction. Using those tools, the user and her doctor may carry out a wide variety of traditional medical consultations. In addition, in some embodiments, where consent has been provided as discussed above, the user may share her own view of her body, as displayed in AR display area 1225 or, in some embodiments, a shared live (real-time) view of her entire video display 1227, with the doctor, who may then view it on his own smartphone, PDA or other computer, also running a version or part of the App. In some embodiments, the user may so share and end sharing that live view, using a continuous pressure activated sharing tool of GUI tools 1103, such as example continuous pressure activated GUI button 1141. In some such embodiments, user 1100 must maintain pressure from her finger 1143 on a touch screen (i.e., smartphone display 1227) at a location within the continuous pressure activated GUI button 1141 to continue causing the control system to share that live view with the healthcare provider. If the user retracts her finger from continuous pressure activated GUI button 1141 permit, such sharing by the control system ceases, in some embodiments. However, in some other embodiments such continuous pressure is not required, or, at least, not required on an ongoing basis, after a set amount of time has passed with such continuous pressure. In this way, accidental, continued sharing of private, sensitive information may be more limited. Also to aid in preventing such unnecessary or unintended sharing of personal health information, in some embodiments, a view reducing GUI tool may be overlaid onto a sub-area of AR display area 1225, such as example partial modesty view blocker tool 1145. In some embodiments, user 1100 may indicate a private 3D object or area (e.g., a private area of her body) for which such a partial modesty view blocker tool will be provided by the control system (e.g., by circumscribing the area of AR display area 1225 where the private object or area presently appears). In some embodiments, as with other virtual objects provided in the present application, the control system running the App will track the location of that private 3D object or area, and adjust the size and shape of the partial modesty view blocker tool accordingly, to cover it, while providing an unobstructed view of other objects and body parts, to the healthcare provided. In some embodiments, such a partial modesty view blocker tool may take the form of a darkened or color-blocked area, as pictured in example partial modesty view blocker tool 1145. However, any suitable form of privacy-preserving view censoring tool may, alternatively or in addition, be provided, in various embodiments. For example, in some embodiments, such a partial modesty view blocker tool may take the form of a blurred-out region of the screen, giving some information regarding the general nature of the view area being blocked, but not providing a detailed image of that view area. In some embodiments, a button or other user-activatable GUI tool may be provided on or about such a partial modesty view blocker tool. For example, in some embodiments, a censorship indicator 1147 (e.g., the phrase "Modesty Block") may be included within, on or about such a partial modesty view blocker tool. In some embodiments, a user may touch, double-tap or otherwise activate such a censorship indicator 1147, which may cause such a partial modesty view blocker tool to be removed, revealing the private object or areas to the healthcare provided, if needed (e.g., after first prompting the user to "confirm" that she intended to remove that partial modesty view blocker tool by activating the censorship indicator 1147, in some embodiments.)

In any event, based on the real-time view that is provided through, whether it be so limited by partial modesty view blocker tool 1145, the healthcare provided may better guide and explain the cleansing and/or antiseptic regimen, and assess progress therein based on the GUI tools, as well as observe more traditional health factors visually (e.g., wound swelling, lividity, necrosis).

In addition to the specific embodiments set forth immediately above, in some embodiments, an App in accordance with aspects of the present application provides any or all other GUI tool(s), instruction(s) or other technique(s) set forth in the present application for aiding a user and/or their healthcare provider in the decolonization and/or prevention of colonization of bacteria. For example, in some embodiments, such an App includes any of the specialized GUI tools and non-verbal instructions that guide the patient to use combinations of components of sub-compartments of a decolonization and cleaning kit, such as the example decolonization and cleaning kit set forth above, in reference to FIG. 1. For example, in some such embodiments, such a control system and computer software include additional specialized software within the App which includes such non-verbal instructions, for example, on a PDA, such as a smartphone 1105. In some such embodiments, such an App provides additional GUI tools and techniques incorporating cameras and/or other sensors, to monitor and manage user compliance with a bacterial decolonization regimen. However, in some embodiments, such additional GUI tools and techniques include additional verbal instructions. In some such embodiments, such verbal instructions may be an alternative to, or provided in addition to, non-verbal instructions, such as that mentioned immediately above.

As mentioned above, the reference to and/or discussion of any specific examples of embodiments, and any aspect of inventions within this application, is for illustration purposes only, to provide context and illustration of principles and aspects of the inventions far broader than those examples, and those examples in no way limit the scope of the present invention. For example, embodiments provided throughout this application including the devices and/or GUI elements set forth in the figures and discussed in detail in this application are, of course, examples, and not limiting. These example embodiments are intended only as a reasonable set of example structures, substructures, materials, methods, steps and other aspects of the present inventions, the virtually infinite and innumerable possibilities for carrying out the present invention being impossible to exhaustively set forth, and to ease comprehension of the disclosure, as will be readily apparent to those of ordinary skill in the art. For example, the description of one particular order, number or other arrangement of any aspects of the present invention set forth herein is illustrative, not limiting, and all other possible orders, numbers, etc., are also within the scope of the invention, as will be so readily apparent. Any aspect of the invention set forth herein may be included with any other aspect or embodiment, as well as any aspects known in the art, in any number, order, arrangement, or alternative configuration, while still carrying out, and falling within, the scope of the invention.

Figure 13:
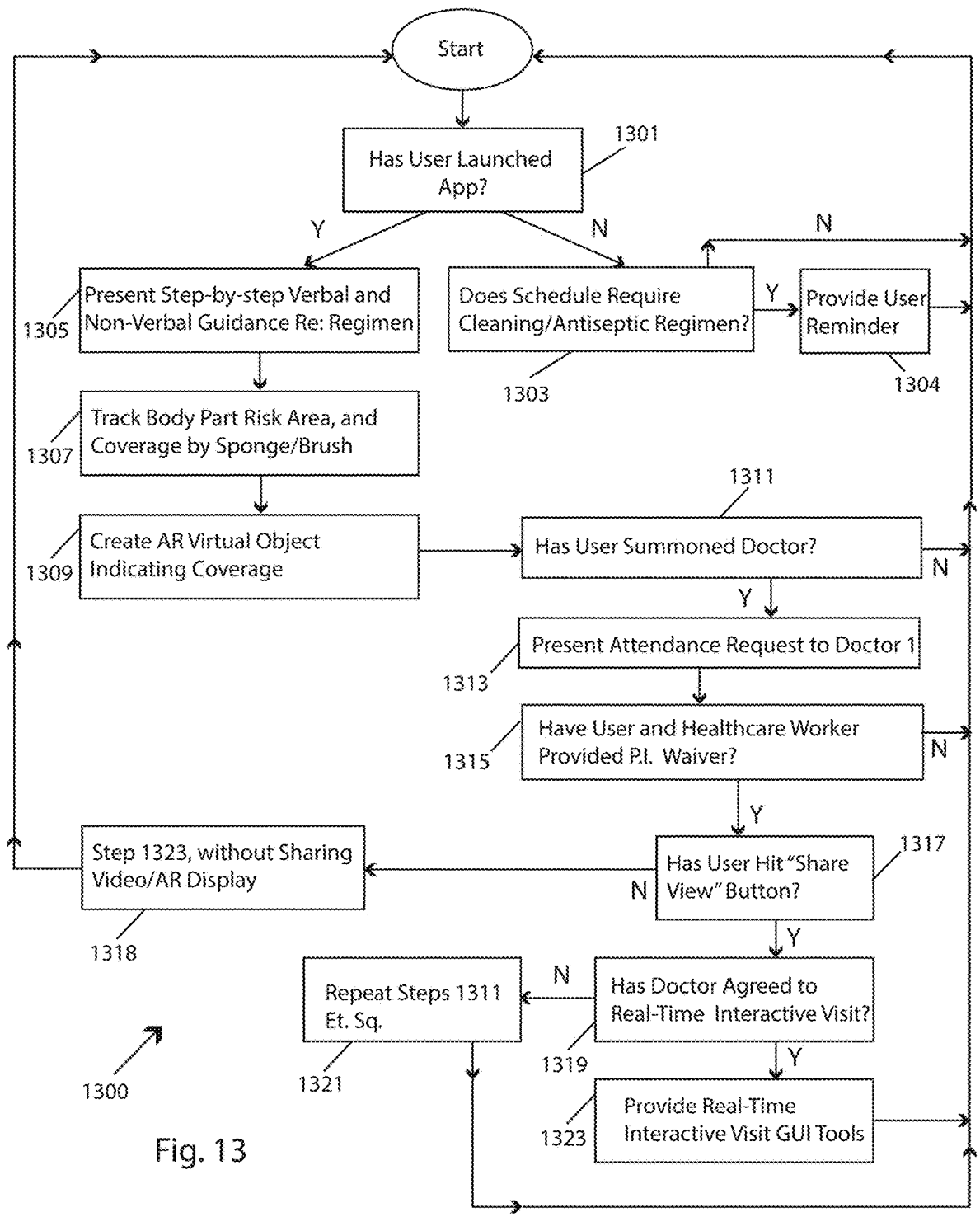
FIG. 13 is an example process flow diagram, illustrating some example steps that may be carried out by a control system including specialized computer hardware and software (such as any of the control systems set forth in reference to FIG. 10, above), in implementing aspects of the present application in accordance with some embodiments.

FIG. 13 is an example process flow diagram, illustrating some example steps 1300 that may be carried out by a control system including specialized computer hardware and software (such as any of the control systems set forth in reference to FIG. 10, above, running an App, as discussed above), in implementing aspects of the present application in accordance with some embodiments.

Beginning with step 1301, in some embodiments, such a control system (the "control system") may first determine whether a user has installed and launched the App on her smartphone, or another PDA or other device including, and/or included within, the control system. As discussed above, the App may monitor and manage user compliance with one or more bacterial decolonization regimen(s), in accordance with aspects set forth in this application. Among other parameters and aspects for such bacterial decolonization regimen(s) that it may so monitor and manage, the App may maintain a schedule for carrying out such regimen(s), and determine if the user has, or is still required, at particular times to carrying out such a regimen. For example, in some embodiments, the App. monitors the user's carrying out such a regimen at particular time intervals (e.g., 1 time per day, or 2 times per day, in some embodiments) which are measured (e.g., by calender and clock sub-features of a smartphone or other computer including the control system). Thus, for example, at step 1303, if the user has run through at least some of steps 1300, in some embodiments, within a particular time period (e.g., the latest 24 or 12 hours, respectively, in the example intervals above) the control system may determine that the user is not currently required to engage in such a regimen, and the control system may return to the starting position. If, however, at step 1303, the control system determines, to the contrary, that the user is still required, and has not carried out, such a regimen, as so required, it may proceed to step 1304, in some embodiments, in which it issues reminder(s) (e.g., as smartphone push notifications) to the user to launch the App, and carry out regimen steps as so required, in subsequent step 1305. In step 1305, as discussed elsewhere in this application, the control system may present several successive methods for decolonizing or preventing the decolonization of bacteria, in accordance with established healthcare guidelines, in some embodiments. In some such embodiments, the user is presented with verbal and/or non-verbal instructions for carrying out particular cleaning and antiseptic techniques, as discussed and shown in greater detail elsewhere in this application, in some embodiments.

As also discussed in greater detail elsewhere in the present application, in some embodiments, the control system monitors, tracks and records the application of a cleaning and/or disinfection formulation and/or preparation. For example, as discussed above, in reference to FIGS. 11 and 12, in some embodiments, a plurality of markers are provided on or about the surface of the sponge or brush, which may be so tracked in both position and orientation by the control system, in subsequent step 1307. Also as discussed, the control system may indicate areas of a user's body that have been cleaned and/or disinfected, to aid in guiding further, more complete cleaning and disinfection by the user, in some embodiments, in step 1309. Accordingly, for example, in that step, the coverage of at least part of an area of the surface of a user's body (or all, in some embodiments), may be indicated by one or more virtual objects, using an AR display, as also discussed elsewhere in this application.

In some embodiments, a user may summon a healthcare provider for a real-time interaction, and carry out any of the types of techniques set forth in this application for such real-time healthcare provider/user interactions, with the aid of the control system, in subsequent step 1311. In some embodiments, if a user does make such a request, summoning such a healthcare worker, the control system may proceed to summon such a healthcare worker, and facilitate the initiation of such an interaction, by first presenting an alert to a healthcare worker through the App, and/or a connected control system of a computer device owned or controlled by the healthcare worker, in some embodiments. For example, in some embodiments, as a first priority, the control system first presents such an alert, first requesting that the user's primary care or specialist doctor ("Doctor 1"), as applicable, participate in the requested interaction, using the App, as discussed in this application. In some such embodiments, if the user's primary care or specialist doctor, as the case may be, declines to so participate, or is otherwise determined to be unavailable to attend such an interaction, the control system may proceed to summon another doctor (e.g., from a ranked list of available healthcare providers, in succession, until such a healthcare provider accepts the request to so participate, in step 1313. The control system may then so connect such a primary doctor, specialist doctor and/or other available healthcare provider, in some embodiments, assuming that the user, and, in some embodiments, such a healthcare provider has similarly agreed to applicable terms and conditions for handling, or is otherwise similarly subjected to terms and conditions for handling, personal information and healthcare (e.g., by professional rules, or another applicable written agreement), as determined by the control system in step 1315. In some embodiments, the control system also determines whether a user has agreed to share a real-time view of her body and environment with the healthcare provider, in step 1317, in addition to obtaining such a general consent to share personal, healthcare-related information. If so, the control system may then proceed to step 1319, in some embodiments, to determine whether the healthcare worker has similarly, specifically assented to such a real-time interaction with the user. If not, the control system may return to step 1311 et seq. If so, however, in some embodiments, the control system may then proceed to facilitate such a real-time interaction, with the aid of communications over a secure, private computer network (e.g., the Internet, using SSL encryption) including both the user's computer system (e.g., smartphone 1105) and a similar computer sytem owned or controlled by the healthcare worker, each of which may include or be included within the control system, in some embodiments. In some such embodiments, the control system, running the App, may provide any of the GUI tools set forth above, or similar tools, for carrying out such an interaction, in step 1323.

Assuming that valid waivers have been so provided, and the user and healthcare worker have each agreed to engage in the interaction, as discussed above, but either the user or the healthcare worker does not agree to share such a live view of the user's body and/or environment to aid in medical treatment via such a real-time interaction, however, the control system may proceed to step 1318, in which it does provide a real-time interaction (e.g., via audio interaction, as discussed in this application and/or other verbal or non-verbal guidance and instructions) in step 1323, but without the benefit of providing such a live view.

Figure 14:
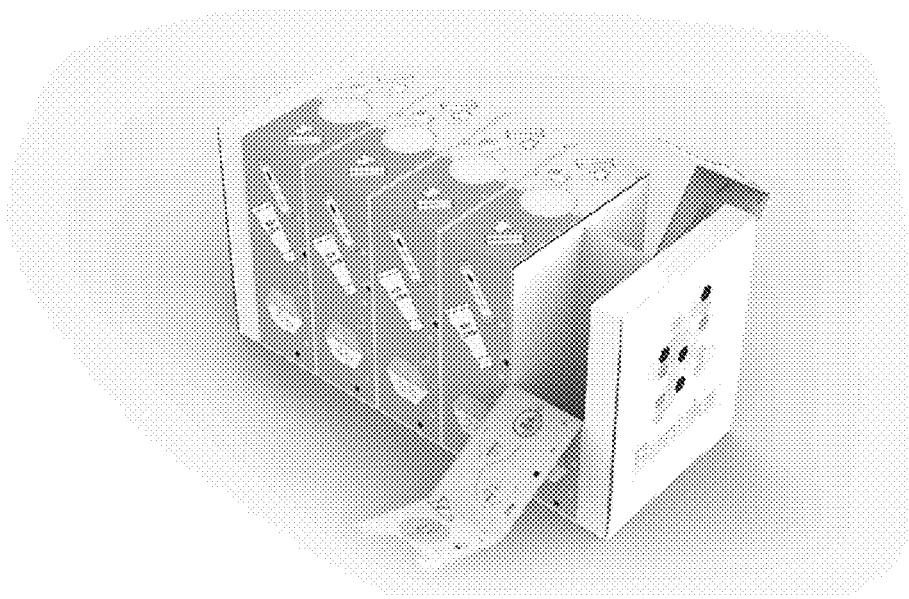
FIG. 14 is perspective view from the left- and top-side of another example form of a decolonization and cleaning kit including a case having a plurality of compartments, for carrying components for aiding in the decolonization of microbes (e.g., bacteria, such as MRSA) from a human user's body, in accordance with aspects of the present invention.

FIG. 14 is perspective view from the left- and top-side of another example form of a decolonization and cleaning kit including a case having a plurality of compartments, for carrying components for aiding in the decolonization of microbes (e.g., bacteria, such as MRSA) from a human user's body, in accordance with aspects of the present invention.

Figure 15:
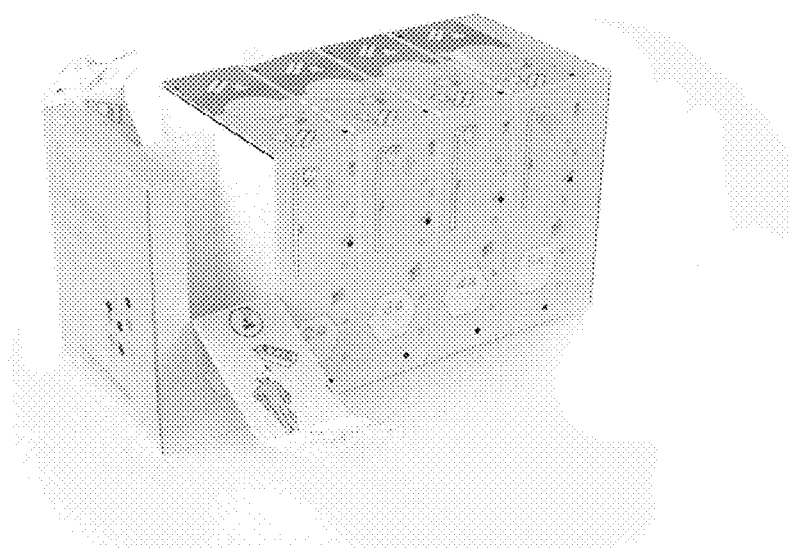
FIG. 15 is perspective view from the right- and top-side of another example form of a decolonization and cleaning kit including a case having a plurality of compartments, for carrying components for aiding in the decolonization of microbes (e.g., bacteria, such as MRSA) from a human user's body, in accordance with aspects of the present invention.

FIG. 15 is perspective view from the right- and top-side of another example form of a decolonization and cleaning kit including a case having a plurality of compartments, for carrying components for aiding in the decolonization of microbes (e.g., bacteria, such as MRSA) from a human user's body, in accordance with aspects of the present invention.

Figure 16:
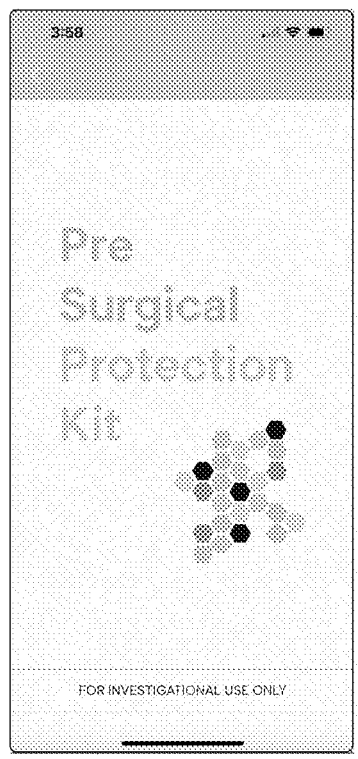
FIG. 16 is a front view of an example ornamental design for a user interface, to be provided (e.g., on a display) of a smartphone or other PDA, in accordance with some aspects of the present application.

FIG. 16 is a front view of an example ornamental design for a user interface, to be provided (e.g., on a display) of a smartphone or other PDA, in accordance with some aspects of the present application.

Figure 17:
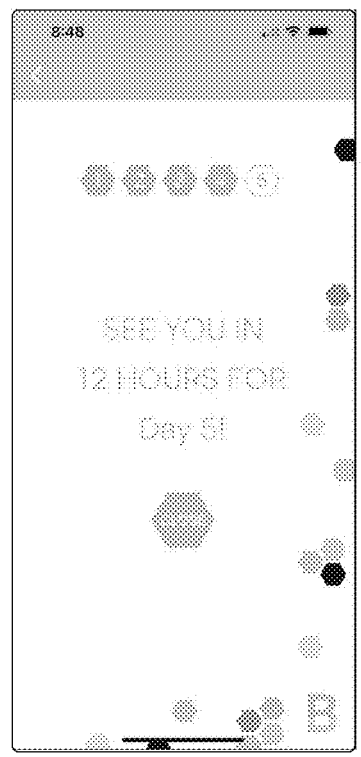
FIG. 17 is a front view of an example ornamental design for a user interface, to be provided (e.g., on a display) of a smartphone or other PDA, in accordance with some aspects of the present application.

FIG. 17 is a front view of an example ornamental design for a user interface, to be provided (e.g., on a display) of a smartphone or other PDA, in accordance with some aspects of the present application.

Figure 18:
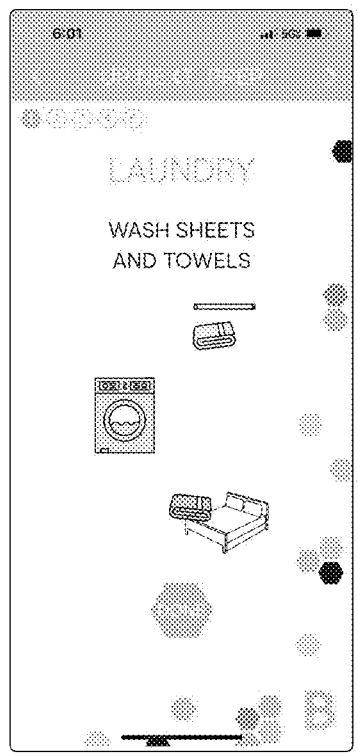
FIG. 18 is a front view of an example ornamental design for a user interface, to be provided (e.g., on a display) of a smartphone or other PDA, in accordance with some aspects of the present application.

FIG. 18 is a front view of an example ornamental design for a user interface, to be provided (e.g., on a display) of a smartphone or other PDA, in accordance with some aspects of the present application.

Figure 19:
FIG. 19 is a front view of an example ornamental design for a user interface, to be provided (e.g., on a display) of a smartphone or other PDA, in accordance with some aspects of the present application.

FIG. 19 is a front view of an example ornamental design for a user interface, to be provided (e.g., on a display) of a smartphone or other PDA, in accordance with some aspects of the present application.

What is claimed is:

1. A system for facilitating prevention of infection, comprising:
   a control system, comprising specialized computer hardware and software, comprising:
   a portable wireless device, comprising at least one sensor(s) configured to recognize object(s) in or about an environment surrounding a first, patient user of the control system;
   a display including a graphical user interface (GUI), comprising specialized GUI tools configured to monitor and manage a bacterial infection decolonization and prevention regimen, comprising:
   one or more sensor(s) comprised in and/or communicatively connected with said portable wireless device;
   wherein said control system is configured to track both a location and an orientation of a surface of a three-dimensional (3D) object at or about an area to be treated with a cleanser and/or antiseptic preparation; and
   wherein said control system is configured to track coverage of said surface of a 3D object at or about an area to be treated with a cleanser and/or antiseptic preparation by said cleanser and/or antiseptic preparation in real time.

2. The system for facilitating prevention of infection of claim 1, wherein said specialized GUI tools comprise a waiver GUI tool, configured to obtain said first, patient user's consent to provide private, healthcare-related information through the system to a second, healthcare worker user of the control system.

3. The system for facilitating prevention of infection of claim 2, wherein the control system is configured to facilitate a real-time, remote audio/visual (AV) interaction between said first, patient user and said second, healthcare worker user, and wherein said first, patient user's consent to provide private, healthcare-related information through the system is a precondition for the control system to so facilitate said real-time, remote AV interaction between said first, patient user and said second, healthcare worker user.

4. The system for facilitating prevention of infection of claim 3, comprising:
   a real-time view access GUI tool which, when activated, provides said second, healthcare user of the system with access to a live view of said environment surrounding said first, patient user.

5. The system for facilitating prevention of infection of claim 4, wherein the real-time view access GUI tool comprises a continuous pressure-activated sharing tool, requiring constant pressure from said first, patient user to maintain said access to said live view of said first, patient user's body and/or an environment surrounding said first, patient user.

6. The system for facilitating prevention of infection of claim 5, wherein said live view of said first, patient user's body and/or an environment surrounding said first, patient user is presented in an augmented reality (AR) display area of said display, and wherein said GUI tools comprise one or more virtual object(s) overlaid onto said live view of said first, patient user's body and/or an environment surrounding said first, patient user.

7. The system for facilitating prevention of infection of claim 6, wherein said one or more virtual object(s) comprises a semi-transparent color enhancement or pattern, overlaid on an area of said live view showing said first, patient user's skin.

8. The system for facilitating prevention of infection of claim 6, wherein said one or more virtual object(s) comprise(s) a modesty blocker, comprising an opaque or view-blurring tool, covering an area designated by said user as especially private.

9. The system for facilitating prevention of infection of claim 8, wherein the GUI tools comprise a GUI tool for lifting the modesty blocker, at the discretion of the first, patient user.

10. The system for facilitating prevention of infection of claim 7, wherein said semi-transparent color enhancement or pattern is overlaid on an area of said live view showing said first, patient user's skin is overlaid to cover only an area designated as an infection risk area.

11. The system for facilitating prevention of infection of claim 7, wherein said area designated as an infection risk area includes a perimeter at or about a particular distance from a wound.

12. The system for facilitating prevention of infection of claim 1, wherein the control system is configured to facilitate a real-time, remote audio/visual (AV) interaction between said first, patient user and said second, healthcare worker user, and wherein said first, patient user's consent to provide private, healthcare-related information through the system is a precondition for the control system to so facilitate said real-time, remote AV interaction between said first, patient user and said second, healthcare worker user.

13. The system for facilitating prevention of infection of claim 1, comprising:
   a real-time view access GUI tool which, when activated, provides said second, healthcare user of the system with access to a live view of said environment surrounding said first, patient user.

14. The system for facilitating prevention of infection of claim 13, wherein the real-time view access GUI tool comprises a continuous pressure-activated sharing tool, requiring constant pressure from said first, patient user to maintain said access to said live view of said first, patient user's body and/or an environment surrounding said first, patient user.

15. The system for facilitating prevention of infection of claim 13, wherein said live view of said first, patient user's body and/or an environment surrounding said first, patient user is presented in an augmented reality (AR) display area of said display, and wherein said GUI tools comprise one or more virtual object(s) overlaid onto said live view of said first, patient user's body and/or an environment surrounding said first, patient user.

16. The system for facilitating prevention of infection of claim 15, wherein said one or more virtual object(s) comprises a semi-transparent color enhancement or pattern, overlaid on an area of said live view showing said first, patient user's skin.

17. The system for facilitating prevention of infection of claim 16, wherein said semi-transparent color enhancement or pattern is overlaid on an area of said live view showing said first, patient user's skin is overlaid to cover only an area designated as an infection risk area.

18. The system for facilitating prevention of infection of claim 15, wherein said one or more virtual object(s) comprise(s) a modesty blocker, comprising an opaque or view-blurring tool, covering an area designated by said user as especially private.

19. The system for facilitating prevention of infection of claim 18, wherein the GUI tools comprise a GUI tool for lifting the modesty blocker, at the discretion of the first, patient user.

* * * * *